(12) United States Patent
Serizawa et al.

(10) Patent No.: US 6,311,024 B1
(45) Date of Patent: Oct. 30, 2001

(54) SYSTEM FOR DETECTING THE STATUS OF AN IMAGE FORMING APPARATUS

(75) Inventors: Yoji Serizawa, Kawasaki; Masako Takahashi, Yokohama, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/619,275

(22) Filed: Jul. 19, 2000

Related U.S. Application Data

(62) Division of application No. 09/379,126, filed on Aug. 23, 1999, now Pat. No. 6,130,999, which is a division of application No. 08/603,714, filed on Feb. 20, 1996, now Pat. No. 6,021,284.

(30) Foreign Application Priority Data

Feb. 22, 1995 (JP) .................................................. 7-33802
Jun. 7, 1995 (JP) ................................................. 7-140573

(51) Int. Cl.⁷ .................................................. G03G 15/00
(52) U.S. Cl. .................................. 399/8; 399/16; 399/23; 399/45
(58) Field of Search ............................... 399/8, 9, 11, 16, 399/18, 23, 38, 45, 75, 76

(56) References Cited

U.S. PATENT DOCUMENTS

| | | |
|---|---|---|
| 4,167,322 | 9/1979 | Yano et al. . |
| 4,876,606 | 10/1989 | Banno et al. ........................ 358/434 |
| 5,057,866 | 10/1991 | Hill, Jr. et al. . |
| 5,090,830 | 2/1992 | Kroeger et al. ...................... 400/719 |
| 5,138,377 | 8/1992 | Smith et al. . |
| 5,164,770 | 11/1992 | Furuichi et al. . |
| 5,214,772 | 5/1993 | Weinberger et al. ................. 395/575 |
| 5,220,674 | 6/1993 | Morgan et al. ....................... 395/800 |
| 5,282,127 | 1/1994 | Mii ....................................... 399/8 X |
| 5,291,420 | 3/1994 | Matsumoto et al. .................. 364/525 |
| 5,333,286 | 7/1994 | Weinberger et al. ................. 395/575 |
| 5,361,265 | 11/1994 | Weinberger et al. ............... 371/29.1 |
| 5,365,310 | 11/1994 | Jenkins et al. . |
| 5,398,257 | 3/1995 | Groenteman ......................... 375/200 |
| 5,412,779 | 5/1995 | Motoyama ............................ 395/275 |
| 5,434,650 | 7/1995 | Nakahara et al. . |
| 5,586,250 | 12/1996 | Carbonneau et al. .......... 395/185.01 |
| 5,649,120 | 7/1997 | Motoyama ........................... 399/8 X |
| 5,872,635 | 2/1999 | Akiyama .............................. 358/296 |
| 5,897,235 | 4/1999 | Honma .................................... 399/8 |
| 5,910,849 | 6/1999 | Tamagaki ........................ 358/443 X |

Primary Examiner—William J. Royer
(74) Attorney, Agent, or Firm—Fitzpatrick, Cella, Harper & Scinto

(57) ABSTRACT

An engine control unit of a printer engine checks he status of each part of the printer, and if there is any change in the status, generates a predetermined representative status of changes and outputs a status change signal to a controller (RIP). The controller is informed of a change in the status by the status change signal, and reads the predetermined representative status to discriminate the changed status from unchanged statuses. In accordance with the discriminated status, the current status can be read. Accordingly, it is not necessary to periodically read the statuses, improving the efficiency of an image forming process. A status change informing control unit in the engine control unit sets a changing status bit of a basic status or status change signal and sends it to the controller, when there occurs a change in any data of a presence/absence and paper size of a paper sheet at a paper feeding port and a loading state of an optional paper feeder. The controller periodically monitors the basic status or status change signal. Only when the changing status bit becomes true, the controller requests the engine control unit to supply the status data representative of a presence/absence, paper size, or loading state of an optional paper feeder.

20 Claims, 29 Drawing Sheets

FIG. 4A

STATUS 0

| BIT | CONTENTS |
|---|---|
| BIT 7 | 0 |
| BIT 6 | PRINT REQUEST |
| BIT 5 | TRANSPORTING PAPER |
| BIT 4 | MISPRINT |
| BIT 3 | WAITING |
| BIT 2 | SLEEPING |
| BIT 1 | CALL |
| BIT 0 | ODD PARITY |

STATUS 1

| BIT | CONTENTS |
|---|---|
| BIT 7 | 0 |
| BIT 6 | NO CARTRIDGE |
| BIT 5 | UNKNOWN |
| BIT 4 | NO PAPER |
| BIT 3 | JAM |
| BIT 2 | DOOR OPEN |
| BIT 1 | TEST PRINT |
| BIT 0 | ODD PARITY |

STATUS 2

| BIT | CONTENTS |
|---|---|
| BIT 7 | 0 |
| BIT 6 | MALFUNCTION OF FIXING DEVICE |
| BIT 5 | MALFUNCTION OF BD |
| BIT 4 | MALFUNCTION OF SCANNER |
| BIT 3 | UNKNOWN |
| BIT 2 | MALFUNCTION OF MOTOR |
| BIT 1 | UNKNOWN |
| BIT 0 | ODD PARITY |

STATUS 3

| BIT | CONTENTS |
|---|---|
| BIT 7 | 0 |
| BIT 6 | ERROR OF BD |
| BIT 5 | ERROR OF NO VSYNC |
| BIT 4 | UNKNOWN |
| BIT 3 | INCONSISTENCY WITH PAPER SIZE |
| BIT 2 | UNKNOWN |
| BIT 1 | UNKNOWN |
| BIT 0 | ODD PARITY |

FIG. 4B

STATUS 4

| BIT | CONTENTS |
|---|---|
| BIT 7 | 0 |
| BIT 6 | FIRST CASSETTE SIZE BIT 5 |
| BIT 5 | FIRST CASSETTE SIZE BIT 4 |
| BIT 4 | FIRST CASSETTE SIZE BIT 3 |
| BIT 3 | FIRST CASSETTE SIZE BIT 2 |
| BIT 2 | FIRST CASSETTE SIZE BIT 1 |
| BIT 1 | FIRST CASSETTE SIZE BIT 0 |
| BIT 0 | ODD PARITY |

STATUS 5

| BIT | CONTENTS |
|---|---|
| BIT 7 | 0 |
| BIT 6 | SECOND CASSETTE SIZE BIT 5 |
| BIT 5 | SECOND CASSETTE SIZE BIT 4 |
| BIT 4 | SECOND CASSETTE SIZE BIT 3 |
| BIT 3 | SECOND CASSETTE SIZE BIT 2 |
| BIT 2 | SECOND CASSETTE SIZE BIT 1 |
| BIT 1 | SECOND CASSETTE SIZE BIT 0 |
| BIT 0 | ODD PARITY |

FIG. 4C

STATUS 6

| BIT | CONTENTS |
|---|---|
| BIT 7 | 0 |
| BIT 6 | PAPER IN FIRST CASSETTE |
| BIT 5 | PAPER IN SECOND CASSETTE |
| BIT 4 | PAPER IN MP TRAY |
| BIT 3 | PAPER IN ENVELOPE FEEDER |
| BIT 2 | UNKNOWN |
| BIT 1 | UNKNOWN |
| BIT 0 | ODD PARITY |

STATUS 7

| BIT | CONTENTS |
|---|---|
| BIT 7 | 0 |
| BIT 6 | FIRST CASSETTE FUNCTION |
| BIT 5 | SECOND CASSETTE FUNCTION |
| BIT 4 | MP TRAY FUNCTION |
| BIT 3 | ENVELOPE FEEDER FUNCTION |
| BIT 2 | BOTH SIDE FUNCTION |
| BIT 1 | UNKNOWN |
| BIT 0 | ODD PARITY |

STATUS 8

| BIT | CONTENTS |
|---|---|
| BIT 7 | 0 |
| BIT 6 | WARN NO TONER |
| BIT 5 | UNKNOWN |
| BIT 4 | UNKNOWN |
| BIT 3 | UNKNOWN |
| BIT 2 | UNKNOWN |
| BIT 1 | UNKNOWN |
| BIT 0 | ODD PARITY |

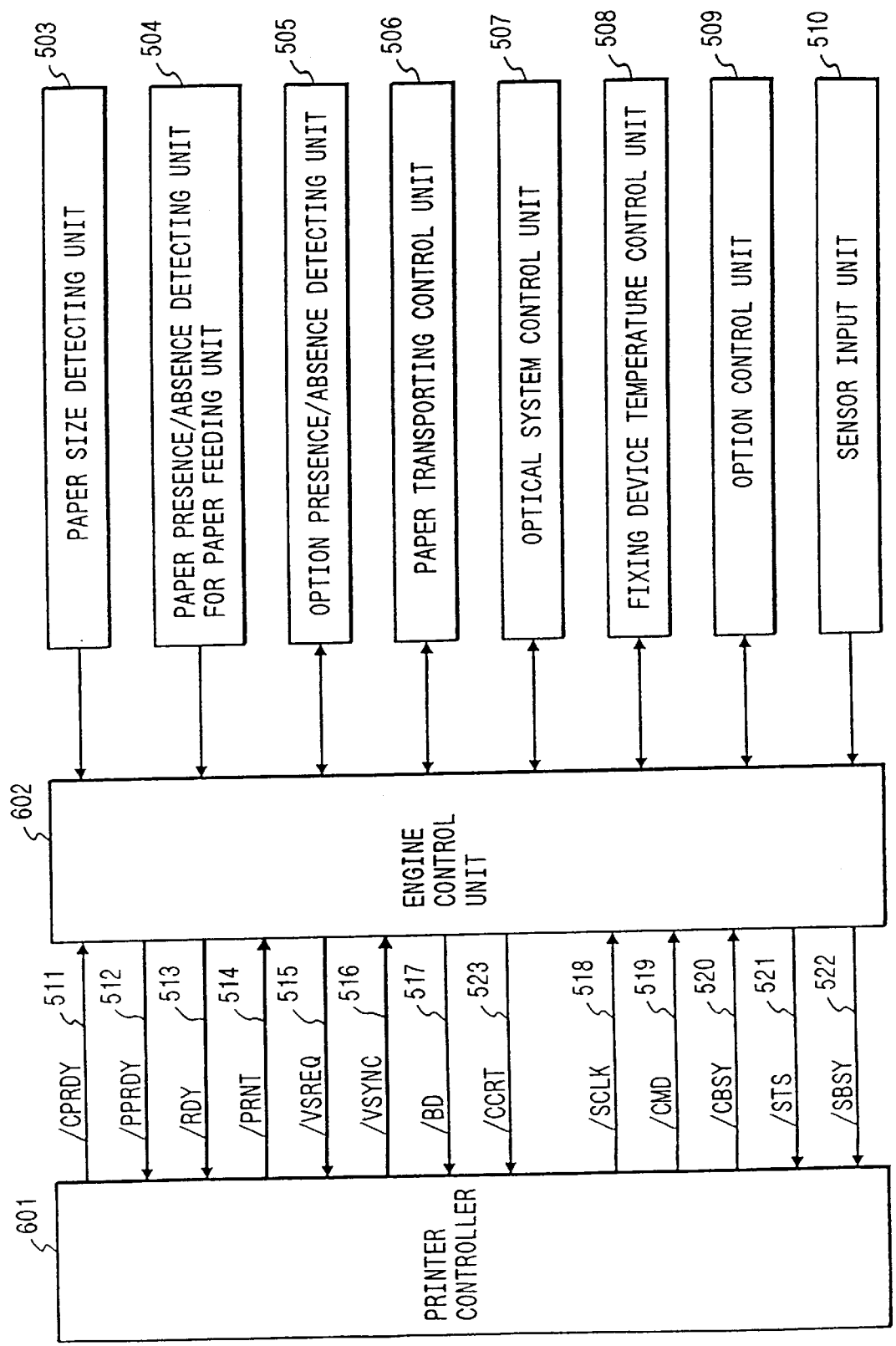

FIG. 12A

STATUS 0

| BIT | CONTENTS |
|---|---|
| BIT 7 | 0 |
| BIT 6 | PRINT REQUEST |
| BIT 5 | TRANSPORTING PAPER |
| BIT 4 | PRE-FEEDING |
| BIT 3 | CHANGING STATUS |
| BIT 2 | UNKNOWN |
| BIT 1 | UNKNOWN |
| BIT 0 | ODD PARITY |

STATUS 1

| BIT | CONTENTS |
|---|---|
| BIT 7 | 0 |
| BIT 6 | MISPRINT |
| BIT 5 | WAITING |
| BIT 4 | SLEEPING |
| BIT 3 | OPERATION CALL |
| BIT 2 | SERVICE CALL |
| BIT 1 | UNKNOWN |
| BIT 0 | ODD PARITY |

STATUS 2

| BIT | CONTENTS |
|---|---|
| BIT 7 | 0 |
| BIT 6 | PAPER SIZE CHANGE |
| BIT 5 | PAPER PRESENCE/ABSENCE CHANGE OF PAPER FEEDING UNIT |
| BIT 4 | FUNCTION CHANGE OF PAPER FEEDING UNIT |
| BIT 3 | CONTENTS CHANGE OF WARNING |
| BIT 2 | UNKNOWN |
| BIT 1 | UNKNOWN |
| BIT 0 | ODD PARITY |

FIG. 12B

STATUS 3

| BIT | CONTENTS |
|---|---|
| BIT 7 | 0 |
| BIT 6 | ERROR OF BD |
| BIT 5 | ERROR OF NO VSYNC |
| BIT 4 | DEFECTIVE TRANSPORT |
| BIT 3 | INCONSISTENCY WITH PAPER SIZE |
| BIT 2 | UNKNOWN |
| BIT 1 | UNKNOWN |
| BIT 0 | ODD PARITY |

STATUS 4

| BIT | CONTENTS |
|---|---|
| BIT 7 | 0 |
| BIT 6 | NO CARTRIDGE |
| BIT 5 | NO PAPER |
| BIT 4 | JAM |
| BIT 3 | DOOR OPEN |
| BIT 2 | UNKNOWN |
| BIT 1 | UNKNOWN |
| BIT 0 | ODD PARITY |

STATUS 5

| BIT | CONTENTS |
|---|---|
| BIT 7 | 0 |
| BIT 6 | MALFUNCTION OF MOTOR |
| BIT 5 | MALFUNCTION OF FIXING DEVICE |
| BIT 4 | MALFUNCTION OF SCANNER |
| BIT 3 | MALFUNCTION OF BD |
| BIT 2 | MALFUNCTION OF LASER |
| BIT 1 | UNKNOWN |
| BIT 0 | ODD PARITY |

FIG. 12C

STATUS 6

| BIT | CONTENTS |
|---|---|
| BIT 7 | 0 |
| BIT 6 | FIRST CASSETTE SIZE BIT 5 |
| BIT 5 | FIRST CASSETTE SIZE BIT 4 |
| BIT 4 | FIRST CASSETTE SIZE BIT 3 |
| BIT 3 | FIRST CASSETTE SIZE BIT 2 |
| BIT 2 | FIRST CASSETTE SIZE BIT 1 |
| BIT 1 | FIRST CASSETTE SIZE BIT 0 |
| BIT 0 | ODD PARITY |

STATUS 7

| BIT | CONTENTS |
|---|---|
| BIT 7 | 0 |
| BIT 6 | SECOND CASSETTE SIZE BIT 5 |
| BIT 5 | SECOND CASSETTE SIZE BIT 4 |
| BIT 4 | SECOND CASSETTE SIZE BIT 3 |
| BIT 3 | SECOND CASSETTE SIZE BIT 2 |
| BIT 2 | SECOND CASSETTE SIZE BIT 1 |
| BIT 1 | SECOND CASSETTE SIZE BIT 0 |
| BIT 0 | ODD PARITY |

STATUS 8

| BIT | CONTENTS |
|---|---|
| BIT 7 | 0 |
| BIT 6 | PAPER IN FIRST CASSETTE |
| BIT 5 | PAPER IN SECOND CASSETTE |
| BIT 4 | PAPER IN MP TRAY |
| BIT 3 | PAPER IN ENVELOPE FEEDER |
| BIT 2 | UNKNOWN |
| BIT 1 | UNKNOWN |
| BIT 0 | ODD PARITY |

FIG. 12D

STATUS 9

| BIT | CONTENTS |
|---|---|
| BIT 7 | 0 |
| BIT 6 | FIRST CASSETTE FUNCTION |
| BIT 5 | SECOND CASSETTE FUNCTION |
| BIT 4 | MP TRAY FUNCTION |
| BIT 3 | ENVELOPE FEEDER FUNCTION |
| BIT 2 | BOTH SIDE FUNCTION |
| BIT 1 | UNKNOWN |
| BIT 0 | ODD PARITY |

STATUS 10

| BIT | CONTENTS |
|---|---|
| BIT 7 | 0 |
| BIT 6 | WARN NO TONER |
| BIT 5 | UNKNOWN |
| BIT 4 | UNKNOWN |
| BIT 3 | UNKNOWN |
| BIT 2 | UNKNOWN |
| BIT 1 | UNKNOWN |
| BIT 0 | ODD PARITY |

| FIG. 14A |
| FIG. 14B |

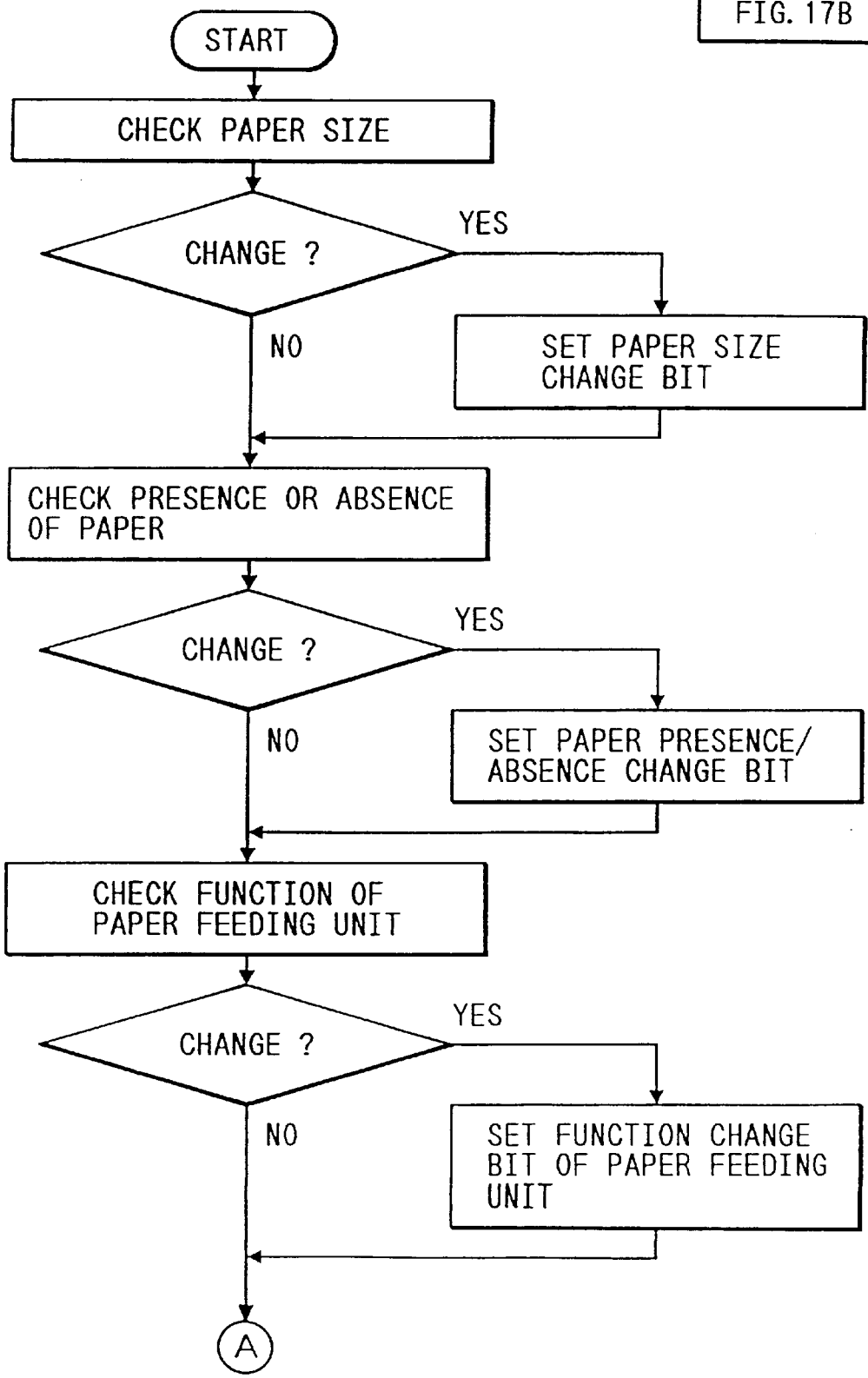

FIG. 22

FORMAT OF STATUS CHANGE MONITOR DESIGNATING COMMAND

FIRST BYTE

| | |
|---|---|
| FIRST BIT (MSB) | 0 |
| SECOND BIT | 1 |
| THIRD BIT | 1 |
| FOURTH BIT | 1 |
| FIFTH BIT | 1 |
| SIXTH BIT | 1 |
| SEVENTH BIT | 1 |
| EIGHTH BIT (LSB) | 1: ODD PARITY |

SECOND BYTE

| | |
|---|---|
| FIRST BIT (MSB) | 0 |
| SECOND BIT | STATUS NUMBER (BINARY SIXTH DIGIT) |
| THIRD BIT | STATUS NUMBER (BINARY FIFTH DIGIT) |
| FOURTH BIT | STATUS NUMBER (BINARY FOURTH DIGIT) |
| FIFTH BIT | STATUS NUMBER (BINARY THIRD DIGIT) |
| SIXTH BIT | STATUS NUMBER (BINARY SECOND DIGIT) |
| SEVENTH BIT | STATUS NUMBER (BINARY FIRST DIGIT) |
| EIGHTH BIT (LSB) | ODD PARITY |

FIG. 23

FORMAT OF STATUS MONITOR MASK COMMAND

| FIRST BYTE | |
|---|---|
| FIRST BIT (MSB) | 0 |
| SECOND BIT | 0 |
| THIRD BIT | 1 |
| FOURTH BIT | 1 |
| FIFTH BIT | 1 |
| SIXTH BIT | 1 |
| SEVENTH BIT | 1 |
| EIGHTH BIT (LSB) | 0: ODD PARITY |

| SECOND BYTE | |
|---|---|
| FIRST BIT (MSB) | 0 |
| SECOND BIT | DESIGNATION OF MASK POSITION |
| THIRD BIT | DESIGNATION OF MASK POSITION |
| FOURTH BIT | DESIGNATION OF MASK POSITION |
| FIFTH BIT | DESIGNATION OF MASK POSITION |
| SIXTH BIT | DESIGNATION OF MASK POSITION |
| SEVENTH BIT | DESIGNATION OF MASK POSITION |
| EIGHTH BIT (LSB) | ODD PARITY |

FIG. 24

FORMAT OF STATUS DESIGNATING COMMAND

| FIRST BYTE | |
|---|---|
| FIRST BIT (MSB) | 0 |
| SECOND BIT | 1 |
| THIRD BIT | 0 |
| FOURTH BIT | 1 |
| FIFTH BIT | 1 |
| SIXTH BIT | 1 |
| SEVENTH BIT | 1 |
| EIGHTH BIT (LSB) | 0:ODD PARITY |

| SECOND BYTE | |
|---|---|
| FIRST BIT (MSB) | 0 |
| SECOND BIT | DESIGNATION OF STATUS |
| THIRD BIT | DESIGNATION OF STATUS |
| FOURTH BIT | DESIGNATION OF STATUS |
| FIFTH BIT | DESIGNATION OF STATUS |
| SIXTH BIT | DESIGNATION OF STATUS |
| SEVENTH BIT | DESIGNATION OF STATUS |
| EIGHTH BIT (LSB) | ODD PARITY |

SYSTEM FOR DETECTING THE STATUS OF AN IMAGE FORMING APPARATUS

This application is a division of Ser. No. 09/379,126 filed Aug. 23, 1999 now U.S. Pat. No. 6,130,999 which is a division of Ser. No. 08/603,714 filed Feb. 20, 1996 now U.S. Pat. No. 6,021,284.

BACKGROUND OF THE INVENTION

1. Field of the Invention

The present invention relates to an image forming apparatus, an apparatus for supplying image data to the image forming apparatus, and a method of interfacing two apparatuses.

2. Related Background Art

FIG. 1 is a schematic diagram showing the structure of an electrophotographic printer which is one example of conventional image forming apparatuses. Referring to FIG. 1, reference numeral 100 represents a photosensitive drum used as an electrostatic latent image storing member. A charger roller 101 is mounted over the photosensitive drum 100 for uniformly charging the surface of the drum 100 in contact therewith. A light emission means applies a light beam 104 to the surface of the photosensitive drum 100 at the charged surface downstream, in the rotation direction, of the contact position with the charger roller 101. The light emission means is constituted by a semiconductor laser 105 for emitting the light beam 104, a scanner 106 for scanning the light beam 104 along the surface of the drum 100, and an optical lens 107 for adjusting the light beam to focus it on the surface of the drum 100 and form a light spot thereon. The light beam 104 is modulated with image data to form an electrostatic latent image on the drum surface. The latent image is developed by a developer 102 to form a toner image, the developer being mounted in contact with the photosensitive drum 100 further downstream, in the rotation direction, of the position where the light beam 104 is applied.

The toner image is transferred on a sheet of transfer paper by a transfer roller 103 mounted under the photosensitive drum in contact therewith. Paper sheets are stacked in a paper stacker 108 disposed in front (at the right in FIG. 1) of the photosensitive drum 100. A paper feed roller 109 is disposed at the end portion of the paper stacker 108, facing the left side toward a transport path. Although a single paper stacker is shown in FIG. 1, paper stackers for different paper sizes may be mounted. Between the paper feed roller 109 and transfer roller 103, a registration roller 111 is mounted which corrects a slant transport of the paper sheet and synchronizes the image formation on the photosensitive drum 100 with the paper transport, to thereby transport the paper sheet to the transfer position at a predetermined timing. A registration tensor 110 is disposed between the registration roller 111 and paper feed roller 109 to detect a presence of the paper sheet.

The paper sheet with tie toner image still not developed is further transported to a fixing device at the back (at the left in FIG. 1) of the photosensitive drum 100. The fixing device is constituted by a fixing roller 112 with a fixing device (not shown) being embedded therein and a pressure roller 113 for pressing the fixing roller 112. The toner image on the paper sheet still not developed is developed by pressing and heating the paper sheet transported from the transfer area with the fixing roller 112 and pressure roller 113. An ejecting paper sensor 114 is mounted at the back of the fixing area, the sensor detecting a paper sheet transported from the fixing area. A paper ejecting roller 115 is mounted at the back of the ejecting paper sensor 114 to eject the developed paper sheet.

Next, a control unit of the electrophotographic printer having the above construction will be described with reference to FIG. 2. Referring to FIG. 2, reference numeral 200 represents a host computer at the outside of the electrophotographic printer. The host computer 200 converts image code data entered by a user into parallel or serial data and sends it via a communication line 201 to a controller 202. The controller 202 develops the code data into image data to be transmitted to a printer engine 220, and requests to start printing or paper pre-feeding by sending a command to a printer control unit 203 in the engine 220 or by reading internal data supplied from the printer control unit 203 as statuses. The controller 202 also controls a sync signal for synchronizing an image output timing with a paper transport in the printer. This controller 202 may be installed in the printer or in the host computer.

The controller 202 is connected to an operation panel 204 from which a user sets various printer modes (e.g., a margin area of an image). The operation panel is usually used in an off-line state (disconnected from the communication line to the host computer). The controller 202 connected to the host computer 200 and operation panel 204 transmits data to and from the printer control unit 203 as described above. In order to perform a drive/stop timing control of each mechanical part shown in FIG. 1 and read data supplied from each sensor, the printer control unit 203 is connected to a transporting system drive unit 205, a high voltage system drive unit 206, an optical system drive unit 207, a fixing heater control unit 208, and a sensor input unit 209.

The transporting system drive unit 205 controls a drive/stop of various motors 210 and various rollers 211 and the high voltage system drive unit 206 controls a drive/stop of a charger 212, a developing unit 213, and a transfer unit 214, respectively in response to an instruction from the printer control unit 203. The optical system drive unit 207 controls a drive/stop of a laser 215 and a scanner 216 and the fixing heater control unit 208 controls a drive/stop of a fixing heater 217, respectively in response to an instruction from the printer control unit 203. The sensor input unit 209 reads data from a registration sensor 218, an ejecting paper sensor 219, and a paper size sensor 219a, and supplies the data to the printer control unit 203.

Next, signals transferred between the printer controller 202 and printer (engine) control unit 203 will be described.

Signals to be transferred between the printer controller 202 and engine control unit 203 are as in the following. A signal /CPRDY indicates a communication ready state between the printer controller 202 and engine 220. A signal /PPRDY indicates a communication ready state between the engine control unit 203 and printer controller 202. A signal /RDY indicates a stand-by state allowing the engine control unit 203 to start printing. A signal /PRNT is a print request signal to be issued from the printer controller 202 to the engine control unit 203. A signal /VSREQ is a request signal for a vertical sync signal to be issued by the engine control unit 203 to the printer controller 202. A signal /HSREQ is a request signal for a horizontal sync signal to be issued by the engine control unit 203 to the printer controller 202. A signal /BD is a horizontal sync signal to be outputted from the engine control unit 203 to the printer controller 202. A signal /SCLK is a sync clock signal for serial communication. A signal /CMD is a command signal to be issued from the printer controller 202 to the engine control unit 203. A signal /CBSY is a strobe signal for a command output. A signal /STS indicates a status on the engine to be issued from the printer controller 202 in response to a command. A signal /SBSY is a signal used for outputting a status. Timings of these signals in serial communications are illustrated in FIG. 3.

When a command /CMD is outputted from the printer controller 202, a corresponding status /STS signal is outputted from the engine control unit 203. The sync clock /SCLK is outputted from the printer controller 202. It is assumed that serial communications are performed in the unit of 8-bit length and LSB is used as the parity bit.

Statuses of the engine control unit 203 in serial communications are illustrated in FIGS. 4A to 4C. STATUS0 is a basic status and indicates the fundamental state of the engine 220, STATUS1 and STATUS2 indicate the details when a "call" bit is "1". STATUS3 indicates the details of a misprint when a "misprint" bit of STATUS0 is "1".

STATUS4 and STATUS5 indicate a paper size of a standard cassette and an optional cassette (both not shown). STATUS6 indicates a presence or absence of a paper sheet in each paper feeding unit. STATUS7 indicates a presence or absence of a paper feed function of paper feeding units including an optional cassette. STATUS8 indicates the contents of warning.

In a conventional control using the above statuses, the conditions that the signal /RDY becomes "FALSE", i.e., the printer is not in the stand-by state, are satisfied only when one of bits constituting STATUS1 and STATUS2 becomes "1" and the "call" bit of STATUS0 becomes "1", or when one of bits constituting STATUS3 becomes "1" and the "misprint" bit of STATUS0 becomes "1". Therefore, in order for the printer controller 202 to detect a change in STATUS4 to STATUS8 not directly associated with the signal /RDY, the printer controller 202 is required to always read STATUS4 to STATUS8.

However, although the printer controller 202 is required to periodically monitor these statuses such as paper sizes and a presence or absence of a paper sheet on a paper feeding port presently not designated, other than the data representative of the printer status, particularly the printer ready status, these statuses are not so often changed under the circumstances of general users. Therefore, a conventional control is inefficient.

Still further, in the above-described printer system, the printer controller 202 is required to always read these statuses not directly associated with the signal/RDY, so that a process load on the printer controller 202 increases.

SUMMARY OF THE INVENTION

It is an object of the present invention to provide an image forming apparatus which can solve the above problems.

It is another object of the invention to provide an image forming apparatus and an image forming system capable of readily and quickly detecting the contents of any change in statuses in the apparatus.

The image forming apparatus of this invention comprises data processing means for processing image data supplied from an external unit, image forming means for forming an image on a recording medium in accordance with the image data processed by the data processing means, control means for electrically controlling the image forming means, and means for supplying the data processing means with a status change signal generated in accordance with at least one change in a plurality of predetermined statuses indicating the operation statuses of the image forming means.

The predetermined status is preferably a status of paper feeding.

The status change signal supplying means preferably generates the status change signal in accordance with a change in the plurality of predetermined statuses satisfying predetermined conditions.

According to the present invention, since the contents of a change are checked only after a predetermined status changes. Therefore, other main processes such as image data development can be performed efficiently.

According to the present invention, the statuses in the engine are classified into a plurality of types (e.g., paper size information, presence/absence information of a paper sheet, option information, etc.), a representative status is provided for respective low level statuses, and when there is a change in a low level status, a corresponding bit of the representative status is set to "TRUE". Therefore, even if a status such as a paper size not directly associated with a signal /RDY changes, the contents of a change in the status can be searched with ease.

BRIEF DESCRIPTION OF THE DRAWINGS

FIGS. 4A to 4C are diagrams showing examples of statuses to be sent from the engine control unit to the printer controller.

FIG. 11 is a block diagram showing a print system of a fourth embodiment of the invention.

FIGS. 12A to 12D are diagrams showing examples of statuses to be outputted from the engine control unit of the fourth embodiment of the invention.

FIG. 22 is a diagram showing an example of the format of a status change monitor command of a sixth embodiment of the invention.

FIG. 23 is a diagram showing an example of the format of a status change monitor command of a seventh embodiment of the invention.

FIG. 24 is a diagram showing an example of the format of a status change monitor command of an eighth embodiment of the invention.

DETAILED DESCRIPTION OF THE PREFERRED EMBODIMENTS

Embodiments of the invention will be described with reference to the accompanying drawings.

First Embodiment

Figure 1:
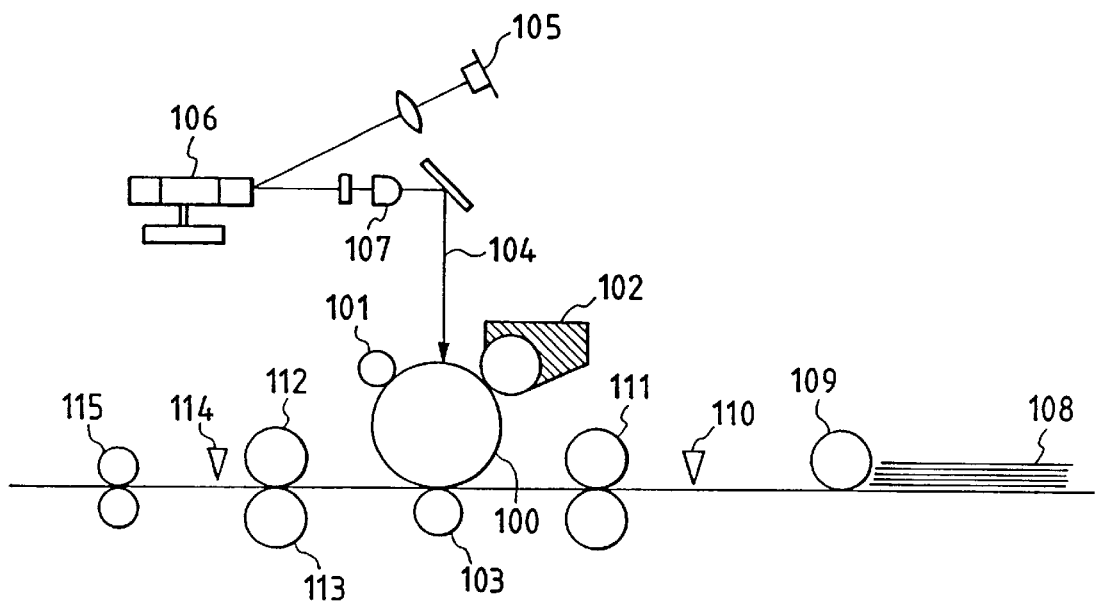
FIG. 1 is a schematic diagram showing the structure of a general laser printer.
Figure 3:
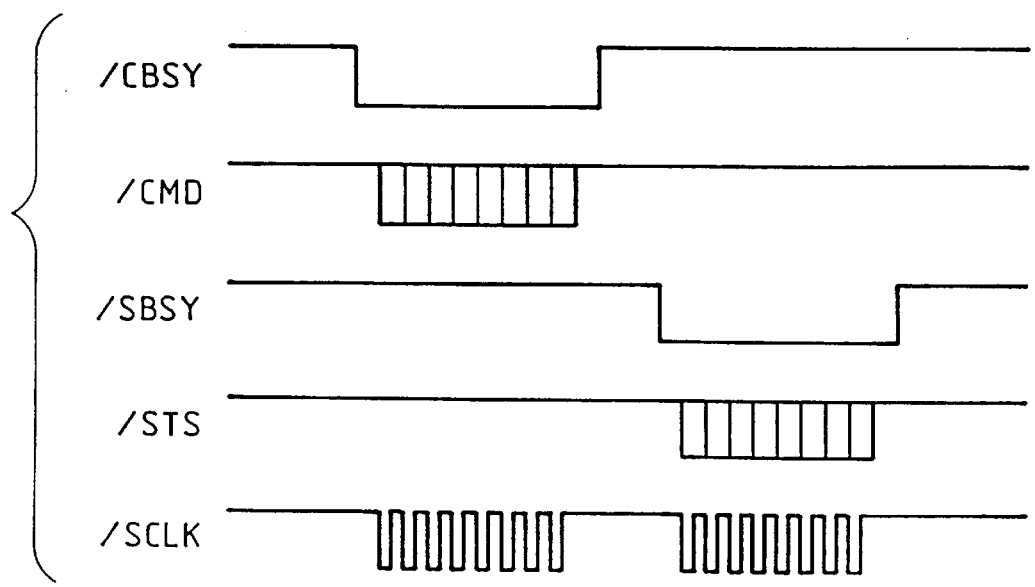
FIG. 3 is a timing chart illustrating communications between the printer controller and the engine control unit.
Figure 5:
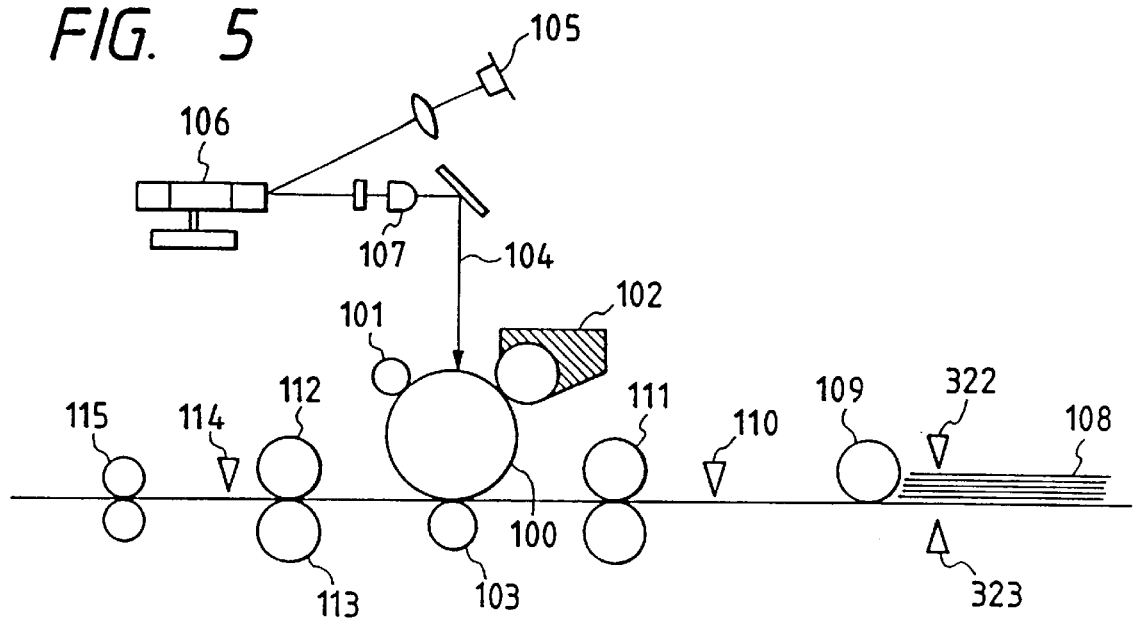
FIG. 5 is a schematic diagram showing the structure of a laser printer to which the invention is applied.

The first embodiment will be described with reference to FIGS. 5 to 7. FIG. 5 is a schematic diagram showing the structure of a printer, and like elements to those shown in FIG. 1 are represented by using identical reference numerals.

Figure 6:
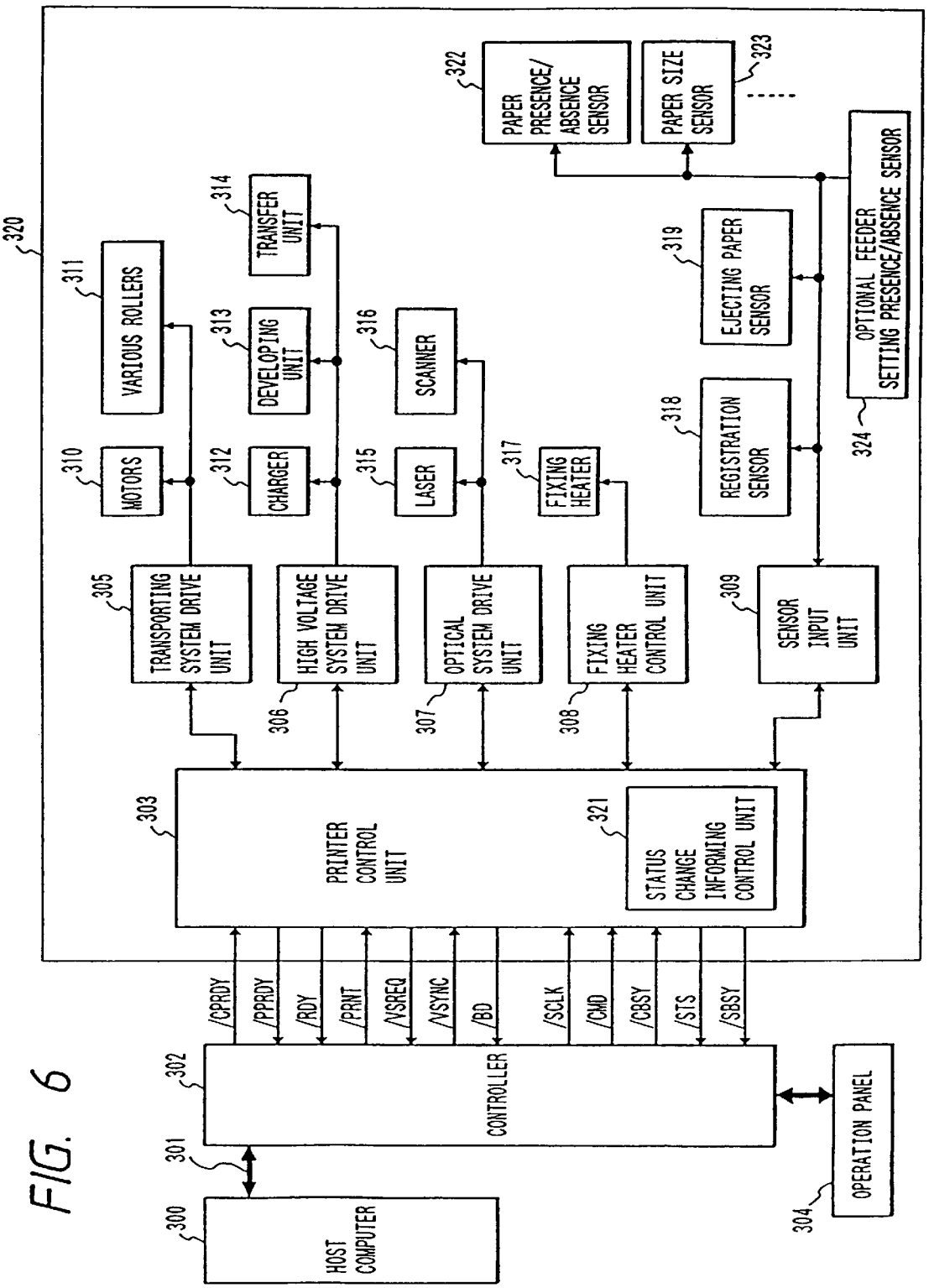
FIG. 6 is a block diagram showing a first embodiment of the invention.

FIG. 6 is a block diagram showing the structure of the embodiment. The characteristic feature of this embodiment resides in that a status change informing control unit is provided in the printer control unit of the printer. In FIG. 6, reference numeral 300 represents a host computer, reference numeral 301 represents a communication line, reference numeral 302 represents a controller, reference numeral 303 represents a printer control unit, reference numeral 304 represents an operation panel, reference numeral 305 represents a transporting system drive unit, reference numeral 306 represents a high voltage system drive unit, reference numeral 307 represents an optical system drive unit, reference numeral 308 represents a fixing heater control unit, reference numeral 309 represents a sensor input unit, reference numeral 310 represents various motors, reference numeral 311 represents various rollers, reference numeral 312 represents a charger, reference numeral 313 represents a developing unit, reference numeral 314 represents a transfer unit, reference numeral 315 represents a laser, reference numeral 316 represents a scanner, reference numeral 317 represents a fixing heater, reference numeral 318 represents a registration sensor, and reference numeral 319 represents an ejecting paper sensor. Referring to FIGS. 5 and 6, reference numeral 322 represents a paper presence/absence sensor, and reference numeral 323 represents a paper size sensor. These sensors are provided for each paper stacker and detects a presence/absence of a paper sheet at a paper feeding port, and a paper size. The detected information is sent to the sensor input unit 309. Reference numeral 324 represents an optional feeder presence/absence sensor (not shown in FIG. 5) for detecting a presence/absence of a newly set optional paper feeder and sending the detected information to the sensor input unit 309.

Referring to FIG. 6, the status change informing control unit 321 checks the detection results of the sensors 322 and 324, and if there is a change in any one of the data sets representative of a presence/absence of a paper sheet on each paper feeding port, a paper size, and setting information of an optional feeder, then sets a "status change bit" in a basic status, and sends it to the controller 302. The basic status is sent, in response to a request from the controller 302, to the printer control unit 303 at a constant period. The controller 302 periodically monitors the basic status, and when it recognizes the status change bit is TRUE, requests the printer control unit 303 to send the status data representative of a presence/absence of a paper sheet, a paper size, and setting information of an optional feeder.

The contents of control by the status change informing control unit 321 will be described with reference to FIG. 7. The status change informing control unit 321 sequentially monitors (Steps S11, S12, S13) a paper size, a paper presence/absence, at each paper feeding port, and setting information of an optional feeder (presence/absence of an optional feeder). If there is any change in these data sets from the previous status, the unit 321 sets the status change bit in the basic status which is sent to the controller (Steps S21, S22, S23).

Second Embodiment

The second embodiment will be described with reference to FIG. 8. The fundamental structure of the mechanical elements of this embodiment is the same as that shown in FIG. 5.

Figure 8:
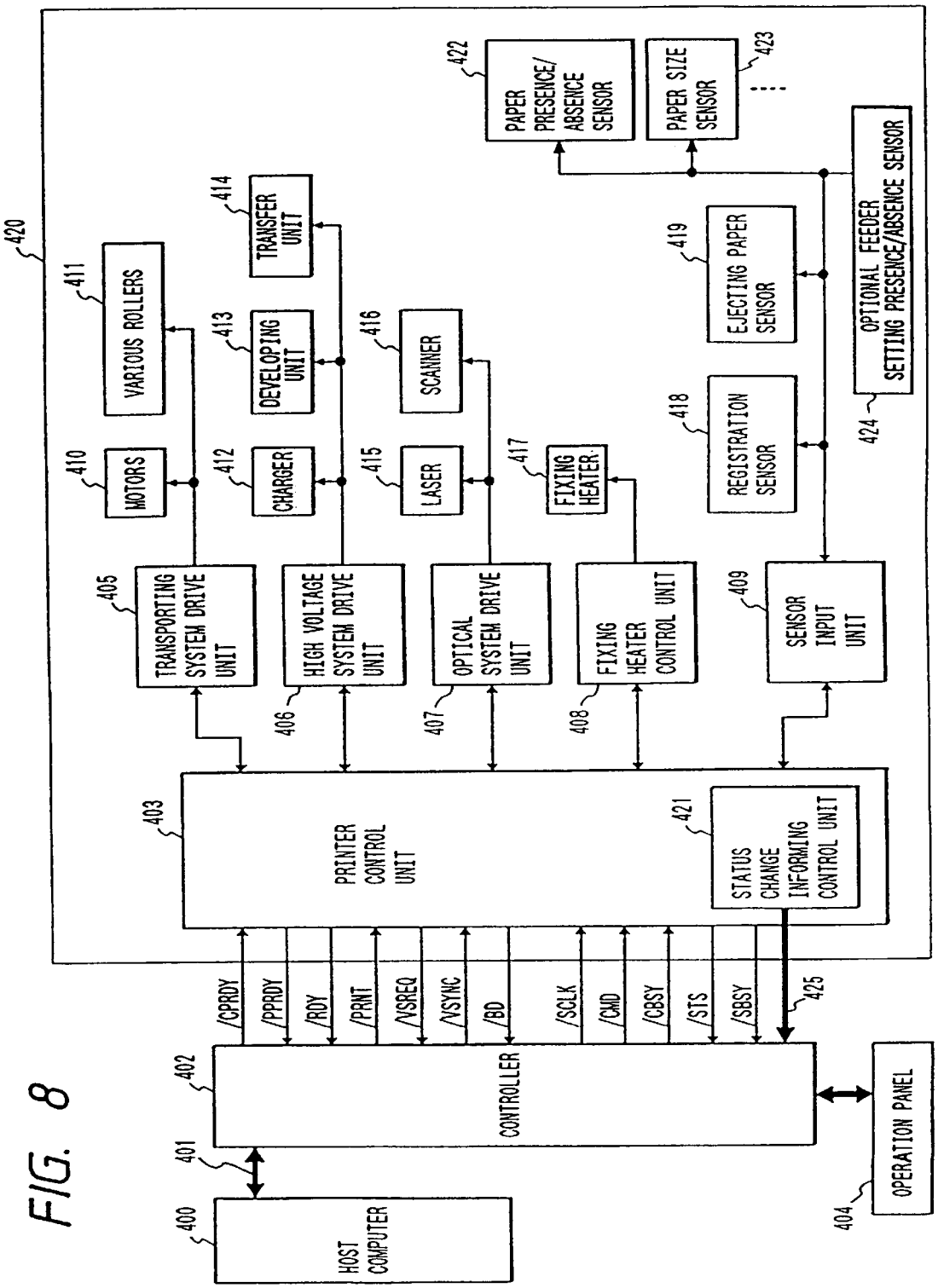
FIG. 8 is a block diagram showing a second embodiment of the invention.

FIG. 8 is a block diagram showing the structure of this embodiment. Similar to the first embodiment, the characteristic feature of this embodiment resides in that a status change informing control unit 421 is provided in the printer control unit 403 of the printer and that status change transmission means 425 is provided. The other structures are generally the same as the first embodiment. Reference numerals in the 300-order correspond to those in the 400-order of the first embodiment.

The control sequence of the status change informing control unit 421 is similar to the first embodiment, except Step S22. In the first embodiment, the status change bit of the basic status is turned ON at Step S22, whereas in the second embodiment, the status change transmission means 425 is provided which is hardware for informing a status change from the engine 420 side to the printer controller 402. In this manner, a process efficiency of the controller can be further improved, and this embodiment is applicable even if the storage capacity for statuses is insufficient.

Third Embodiment

The third embodiment will be described with reference to FIG. 9. The fundamental structure of the mechanical elements of this embodiment is the same as that described with FIG. 5.

A block diagram showing the structure of this embodiment is the same as the first embodiment (FIG. 6).

The control sequence of the status change informing control unit 421 is similar to the first embodiment, except Step S22. In the first embodiment, the status change bit of the basic status is turned ON at Step S22, whereas in this embodiment a status change is informed from the engine side to the printer controller side by using a combination of signals used for other purposes. In this manner, a process efficiency of the printer controller can be improved without raising the cost of the system, and the embodiment is applicable even if the number of bits in the basic status is insufficient.

Figure 9:
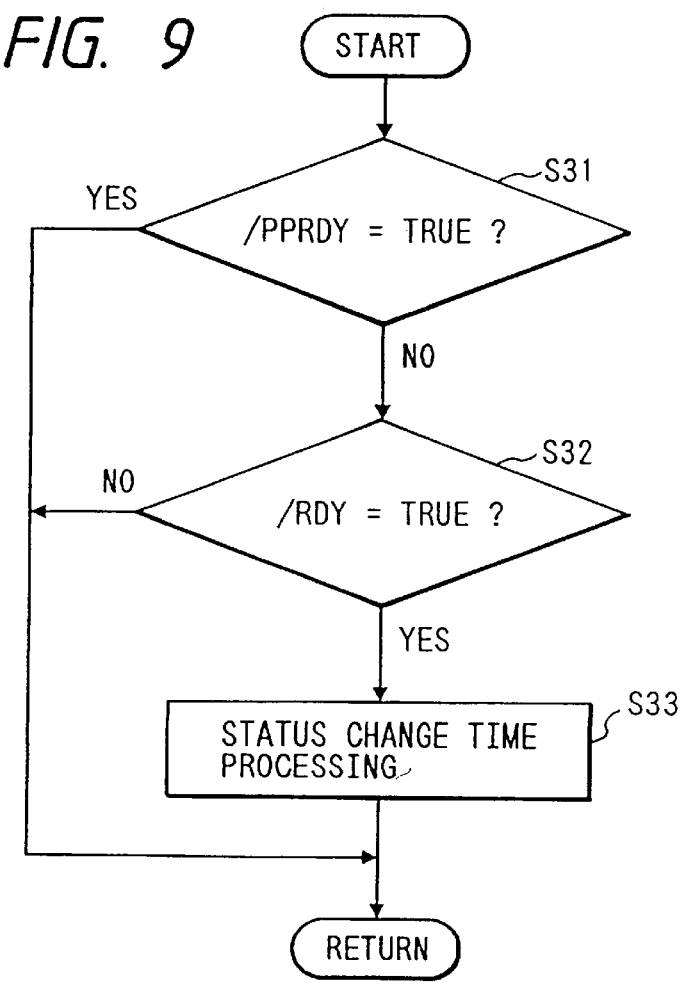
FIG. 9 is a flow chart illustrating the operation of a third embodiment of the invention.

FIG. 9 is a flow chart illustrating the process of checking the data at the controller side. A signal /PPRDY is a signal for indicating that the printer has been initialized after the power-on and serial communications with the controller has been enabled. A signal /RDY is a signal for informing the controller of the fact that the conditions including the signal /PPRDY and other print conditions all have been satisfied. It is obvious that if the signal /PPRDY is FALSE, the signal /RDY necessarily becomes FALSE. In this embodiment, these two signals are used. Specifically, if the signal /RDY becomes TRUE (YES at Step S32) irrespective of whether the signal /PPRDY is FALSE (NO at Step S31), then it is assumed that there is a change in the print conditions. When the controller detects this change, it requests for the statuses of the engine and confirms the contents of the change (Step S33).

Fourth Embodiment

A printer connected to, and controlled by, the printer controller according to the fourth embodiment of the invention will be described.

Structure of Printer

Figure 10:
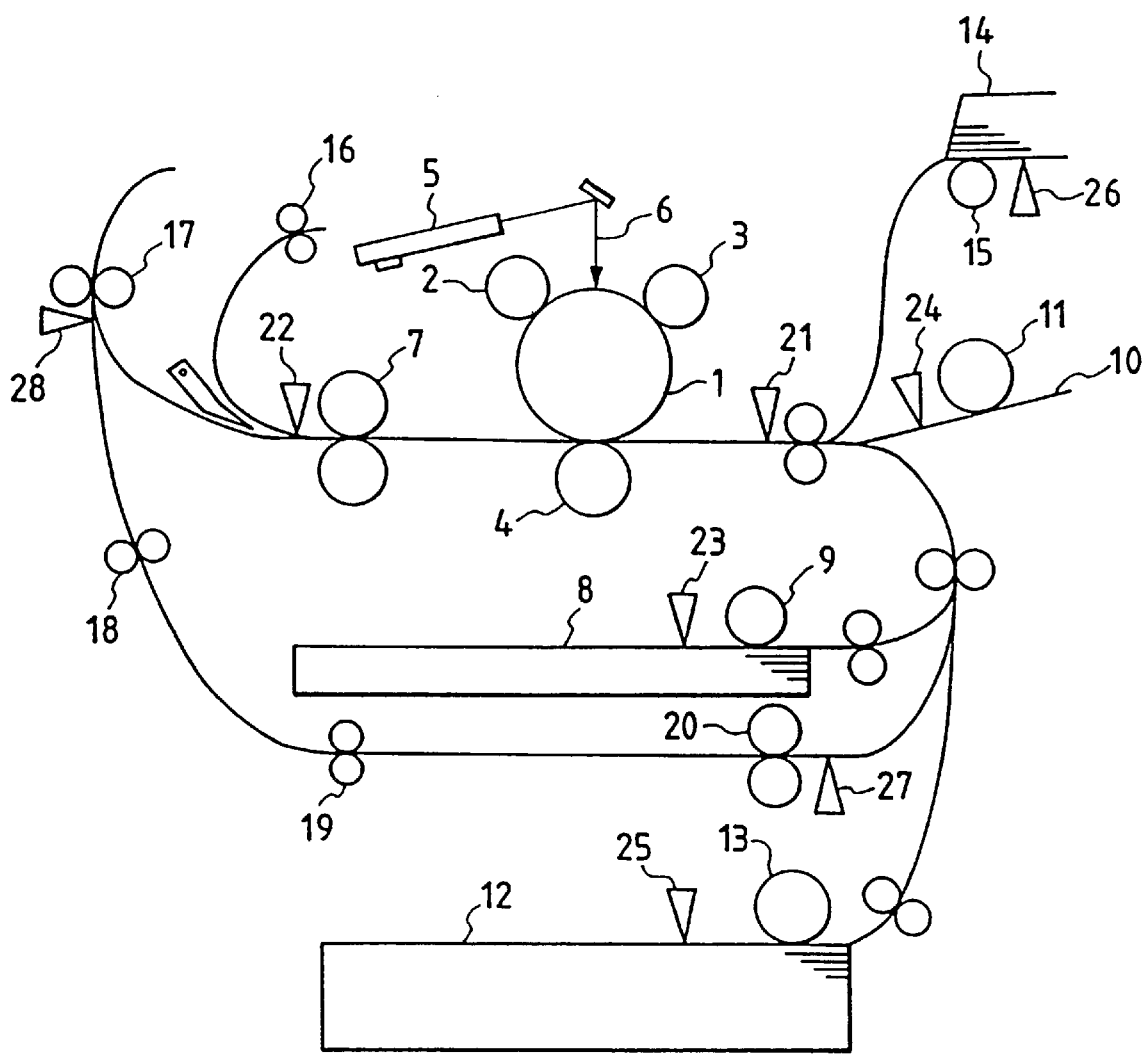
FIG. 10 is a schematic diagram showing the structure of a laser printer as one example of the printer of the embodiments.

FIG. 10 shows the mechanism of the printer of the fourth embodiment of the invention.

In FIG. 10, reference numeral 1 represents a photosensitive drum for forming an electrostatic latent image, reference numeral 2 represents a charger roller for uniformly charging the photosensitive drum 1, reference numeral 5 represents an optical unit for scanning a laser beam on the photosensitive drum 1, reference numeral 6 represents a laser beam emitted from the optical unit 5, reference numeral 3 represents a developing unit for developing an electrostatic latent image with toner, the image being formed on the photosensitive drum 1 by the laser beam, reference numeral 4 represents a transfer roller charger for transferring the toner image on the photosensitive drum 1 onto a predetermined paper sheet, reference numeral 7 represents a fixing device for fixing the toner image by dissolving the toner on the paper sheet, reference numeral 8 represents a standard cassette for stacking print paper sheets, reference numeral 9 represents a standard cassette paper feed roller for picking up a paper sheet from the standard cassette, reference numeral 10 represents a manual feed cassette, reference numeral 11 represents a manual feed sheet roller, reference numeral 12 represents an optional cassette capable of being loaded and unloaded, reference numeral 13 represents an optional cassette sheet roller, reference numeral 14 represents an envelope feeder dedicated to envelopes, reference numeral 15 represents an envelope feed roller, reference numeral 16 represents an ejecting roller for ejecting a paper sheet out of the printer, reference numeral 17 represents a reversing roller for both-side sheet transport, reference numerals 18 and 19 represent both-side transport rollers, reference numeral 20 represents a sheet re-feed roller for re-feeding the other side of a both-side paper sheet, reference numeral 21 represents a registration sensor for the registration of the start of a transported paper sheet from which a print starts, reference numeral 22 represents a paper ejection sensor for detecting whether a paper sheet has been normally ejected out of the fixing device, reference numeral 23 represents a sensor for detecting a presence/absence of a paper sheet on the standard cassette, reference numeral 24 represents a sensor for detecting a presence/absence of a manually fed paper sheet, reference numeral 25 represents a sensor for detecting a presence/absence of a paper sheet on the optional cassette, reference numeral 26 represents a presence/absence of an envelope, and reference numeral 27 represents a sensor for detecting a presence/absence of a both-side paper sheet. There are other sensors not shown in FIG. 10 such as a standard cassette size detecting sensor and an optional cassette size detecting sensor.

FIG. 11 is a block diagram showing the printer control unit of this embodiment.

In FIG. 11, reference numeral 601 represents a printer controller which communicates with the host computer, receives image data, develops the received image data into data which the printer can print, performs serial communications with a printer engine control unit to be described later, and transfers signals to and from the printer engine control unit. Reference numeral 602 represents the engine control unit which transfers signals to and from the printer controller, and controls each unit of the printer engine via serial communications. Reference numeral 503 represents a paper size detecting unit which detects the size of a paper sheet in a cassette and informs the size data to the engine control unit. Reference numeral 504 represents a paper presence/absence detecting unit for a paper feeding unit which detects a presence/absence of a paper sheet at a paper feeding port of a cassette, manual cassette, optional cassette, or envelope feeder, and informs the paper presence/absence data to the engine control unit. Reference numeral 505 represents an option presence/absence detecting unit which detects a connection state of an optional cassette and envelope feeder. Reference numeral 506 represents a paper transporting control unit which controls paper transport. Reference numeral 507 represents an optical system control unit which controls the optical system including a scanner motor and a laser beam. Reference numeral 508 represents a fixing device temperature control unit which controls the temperature, abnormal state, and the like of the fixing device. Reference numeral 509 represents an option control unit which controls the operation of the optional cassette and envelope feeder. Reference numeral 510 represents a sensor input unit which detects registration, ejection, both-sides, reversal, and the like of a paper sheet on the transport path.

A signal /CPRDY 511 indicates a communication ready state between the printer controller 601 and engine control unit 602. A signal /PPRDY 512 indicates a communication ready state between the engine control unit 602 and printer controller 601. A signal /RDY 513 indicates a stand-by state allowing the engine control unit 602 to start printing. A signal /PRNT 514 is a print request signal to be issued from the printer controller 601 to the engine control unit 602. A signal /VSREQ 515 is a request signal for a vertical sync signal to be issued by the engine control unit 602 to the printer controller 601. A signal /BD 517 is a horizontal sync signal to be outputted from the engine control unit 602 to the printer controller 601. A signal /SCLK 518 is a sync clock signal for serial 20 communications. A signal /CMD 519 is a command signal to be issued from the printer controller 601 to the engine control unit 602. A signal /CBSY 520 is a strobe signal for a command output. A signal /STS 521 indicates a status of the engine to be issued from the printer controller 601 in response to a command. A signal /SHSY 522 is a signal used for outputting a status. A signal /CCRT 523 (Condition Change Report) is a signal which becomes "TRUE" when the contents of statuses of the engine not directly associated with the signal /RDY are changed, to thereby inform the printer controller 602 of the change.

Statuses of Printer

FIGS. 12A to 12D show statuses to be outputted from the engine control unit of this embodiment.

STATUS0 is a basic status of the engine and contains a "changing status" bit which takes "1" when a status not directly associated with the signal /RDY representative of a stand-by of the engine control unit is changed. Such statuses not directly associated with the signal /RDY include a cassette size, a presence/absence of a paper sheet in a paper feeding unit, a presence/absence of a paper feeding function, and warning. The signal /CCRT becomes "TRUE" when the "changing status" bit becomes "1".

STATUS1 is a status directly associated with the signal /RDY. STATUS2 is a status constituted by a group of bits representative of a status change indicated by the "status changing" bit of /STATUS0. The bits representative of the status change includes a paper size change, a paper presence/absence change, a function change of paper feeding unit, and a content change of warning. STATUS3 is a status indicating the details of a misprint designated by STATUS1. STATUS4 is a status indicating the details of an operation call designated by STATUS1. STATUS5 is a status indicating the details of a service call designated by STATUS1.

STATUS6 is a status indicating a standard cassette size. STATUS7 is a status indicating the optional cassette size. A paper size change bit of STATUS2 takes "1" when the contents of STATUS6 or STATUS7 change.

STATUS8 indicates a presence/absence of a paper sheet at each paper feeding port. The paper presence/absence change bit of STATUS2 takes "1" when the contents of STATUS8 change.

STATUS9 is a status indicating the structure of each paper feeding unit including an optional cassette. The paper feeding unit function change bit of STATUS2 takes "1" when the contents of STATUS9 change.

STATUS10 is a status indicating toner absence warning. The warning content change bit of STATUS2 takes "1" when the contents of STATUS10 change.

When the status not associated with the signal /RDY changes and the "changing status" bit or /CCRT signal becomes "TRUE", the printer controller 601 checks the contents of STATUS2 to confirm from the changed bit which part of the status has changed. In this manner, the printer controller 601 can efficiently search the status change contents.

Figure 13:
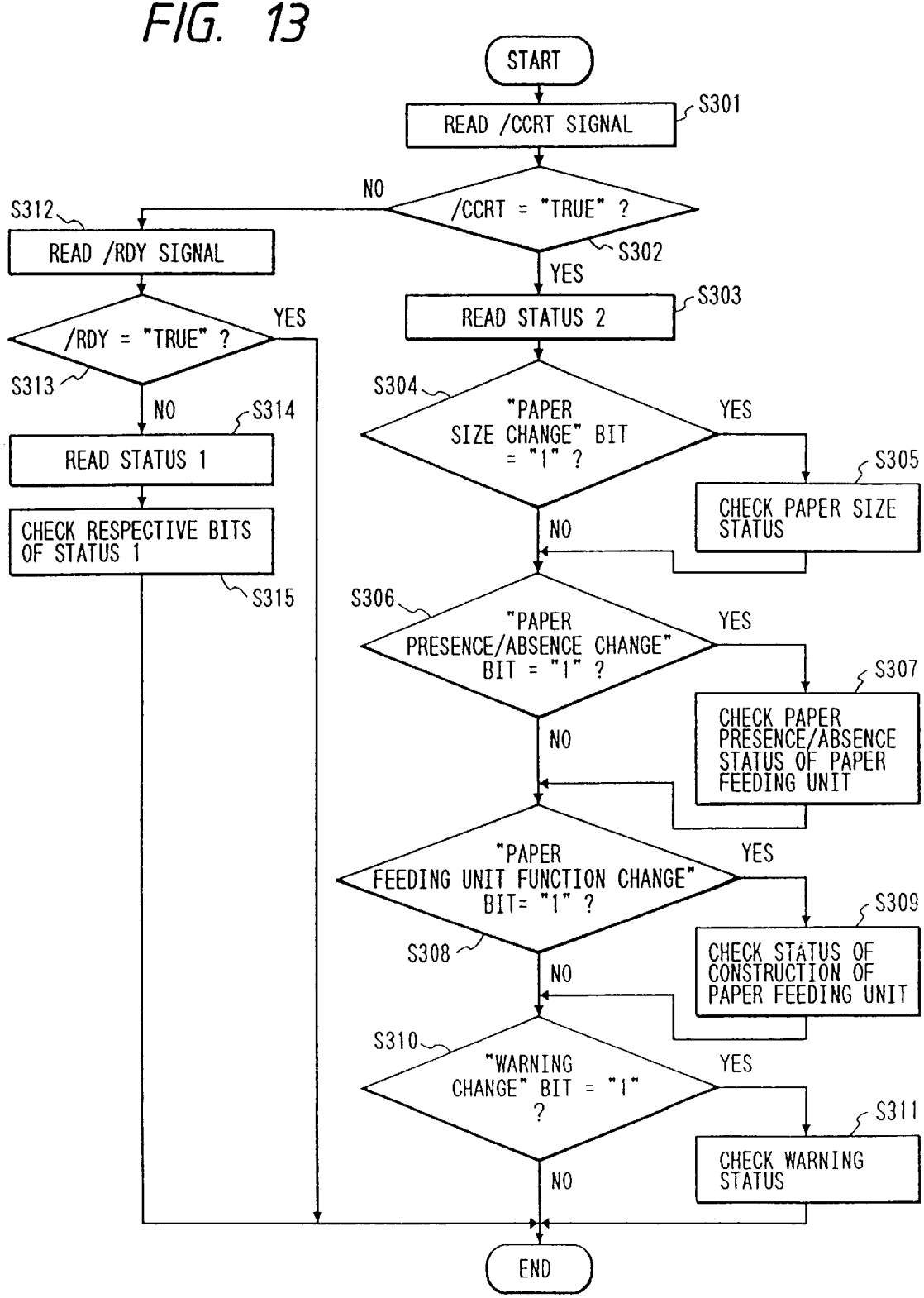
FIG. 13 is a flow chart illustrating a process to be executed by the printer controller of the fourth embodiment of the invention upon occurrence of a status change.

FIG. 13 is a flow chart illustrating the process of searching a status change to be executed by the printer controller 601.

The controller 601 usually checks the signals /RDY and /CCRT (Steps S301, S302, S312, S313), and when there is a change in these signals, it reads the status information. In this case, if the signal /CCRT is "FALSE" and the signal /RDY is also "FALSE", STATUS1 is first checked (Step S314). In accordance with this check, the lower level status corresponding to each bit is referred to and the details are checked (Step S315).

If the signal /CCRT is "TRUE", STATUS2 is first read (Step S303) to discriminate a changed status or statuses from other unchanged statuses and sequentially read the details of bits of the changed status or statuses (Steps S304 to S311).

Reset of Signal /CCRT

Next, the reset procedure of the signal /CCRT which indicates a status change will be described.

Figure 14:
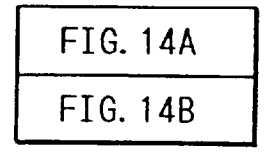
FIG. 14 which is comprised of FIGS. 14A and 14B is a flow chart illustrating a process of outputting a status change from the engine control unit of the fourth embodiment of the invention.
Figure 14A:
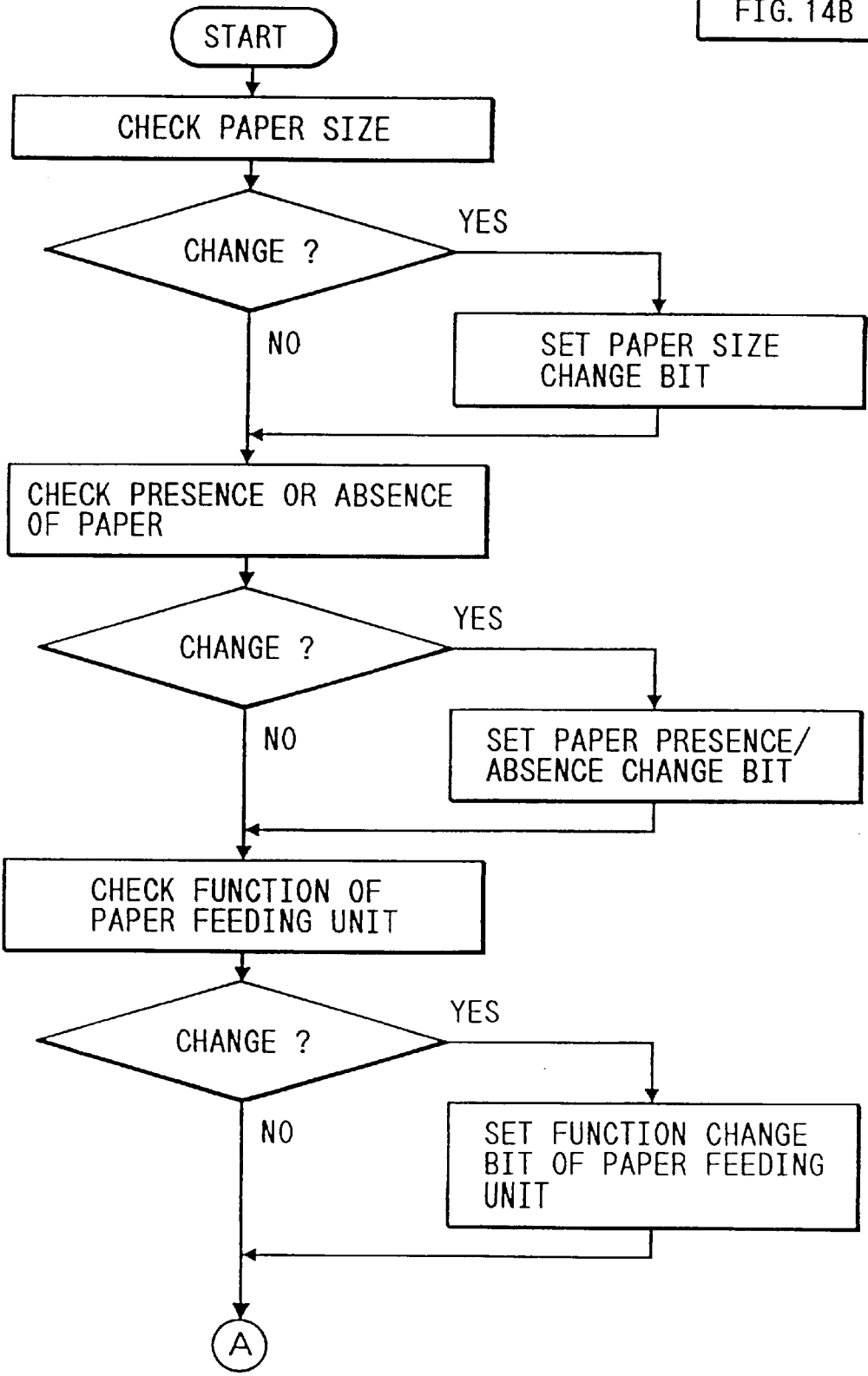
Figure 14B:
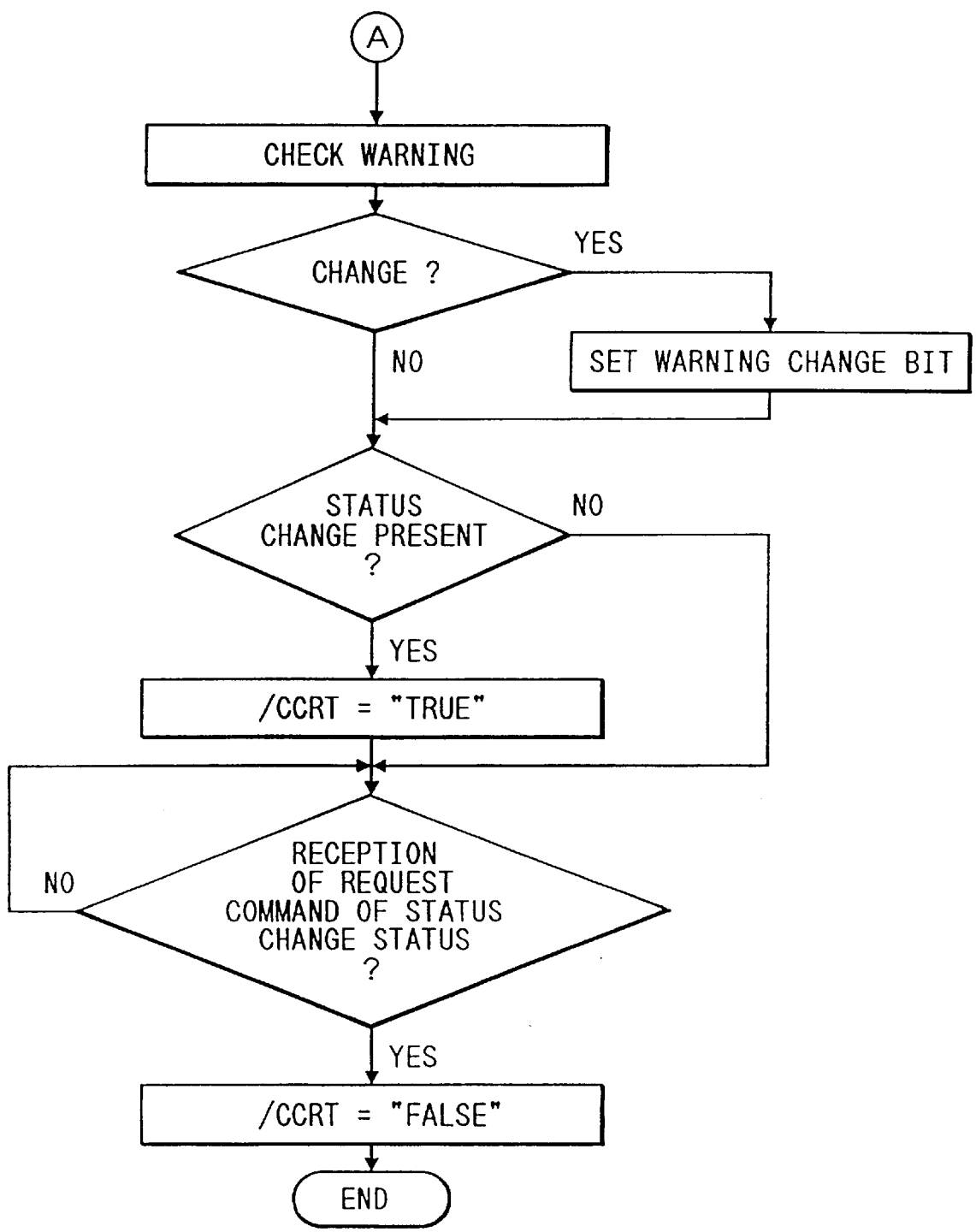

FIGS. 14A and 14B are flow charts illustrating the step of generating a status change status when a change occurs in the status of each engine unit, to be executed by the engine control unit 602.

The engine control unit 602 always checks a change in low level statuses, i.e., a change in the paper size, presence/absence of a paper sheet, paper feeding unit function, and warning contents. If there is a change, the corresponding bit of the upper level status (STATUS2) is set to "1" and the hardware signal /CCRT is set to "TRUE". Thereafter, the signal /CCRT is set to "FALSE" after the status change status is read by the printer controller in response to a status change status request command. The timing when it is assumed that the status change status has been read may be set to either:

(A) when the status change status request command is received; or (B) when the status change status is transmitted after the status change status request command is received.

Each bit of STATUS2 (status change status) is cleared after STATUS2 is transmitted.

Figure 15:
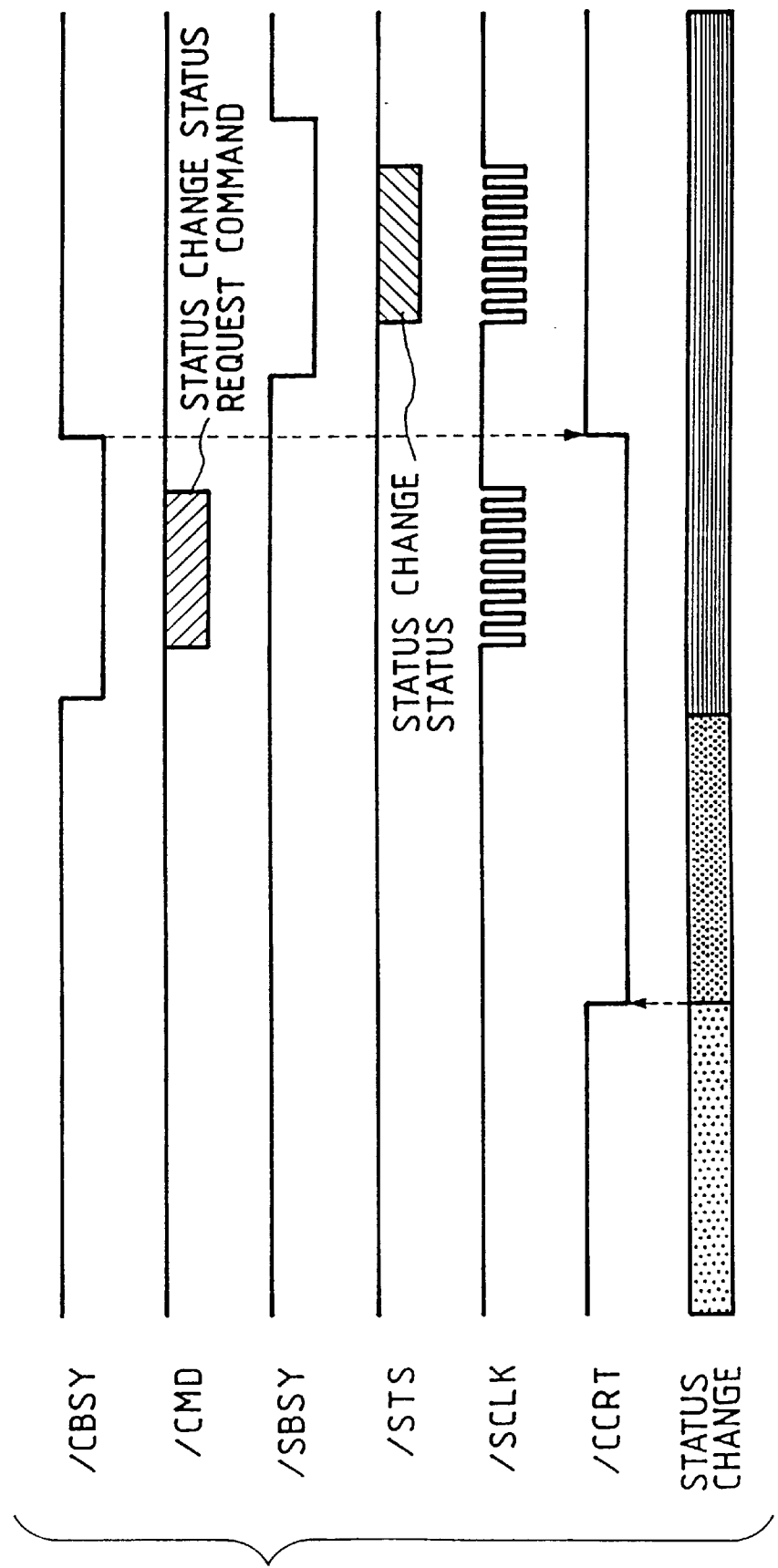
FIG. 15 is a timing chart illustrating status transfer of the fourth embodiment of the invention.
Figure 16:
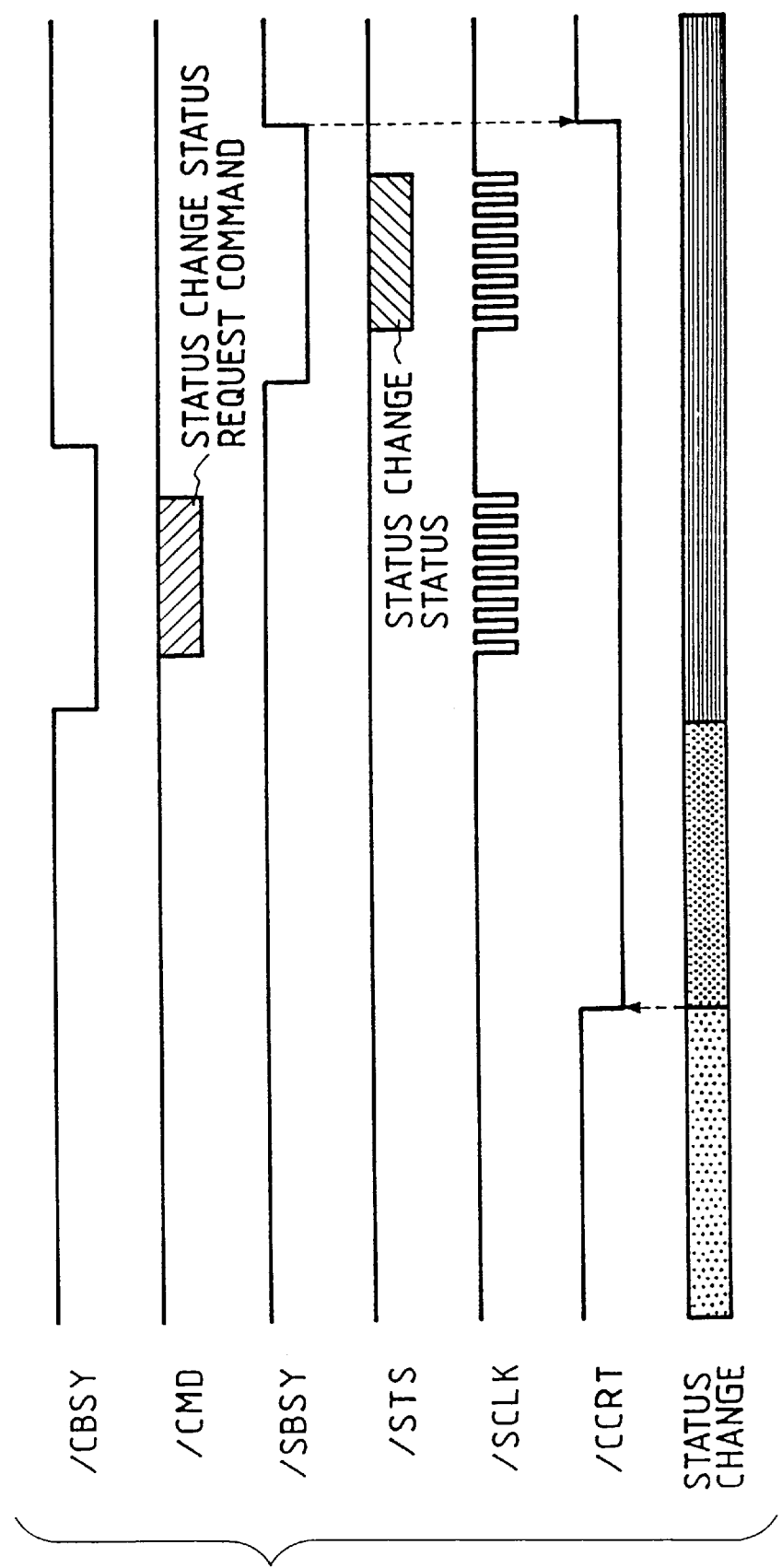
FIG. 16 is a timing chart illustrating status transfer of the fourth embodiment of the invention.

FIG. 15 is a timing chart illustrating status transfer at the above timing (A), and FIG. 16 is a timing chart illustrating status transfer at the above timing (B).

In the case of the timing (A), when a status changes and the signal /CCRT is set to "TRUE" in the process illustrated in FIGS. 14A and 14B, the printer controller 601 detects this signal and issues the status change status (STATUS2) request command. Upon reception of the signal /CMD from the printer controller 601, the engine control unit 602 checks if the signal /CMD is the status change status request command. If the status change status request command, the signal /CCRT is sent as the signal /STS. After the status change status (STATUS2) is sent, each bit of STATUS2 and the signal /CCRT are cleared.

In the case of the timing (B), in response to the status change status request command from the printer controller 601, the engine control unit 602 sends the status change status (STATUS2). After it is confirmed that the status change status has been transmitted to the printer controller 601, each bit of STATUS2 and the signal /CCRT are cleared.

As described above, as compared to a conventional periodical status sampling by the printer controller for detecting a status change not associated with the signal /RDY, this embodiment uses a hardware signal (/CCRT signal) and statuses including the status change status wherein a status change is first notified by the hardware signal /CCRT and thereafter, one status change status (STATUS2) is read to check a particular low level status or statuses and read the details thereof.

Therefore, the amount of periodical status check by the printer controller can be reduced considerably, the image developing process by the printer controller can be efficiently performed, and the printer performance can be improved greatly.

Fifth Embodiment

Figure 17B:
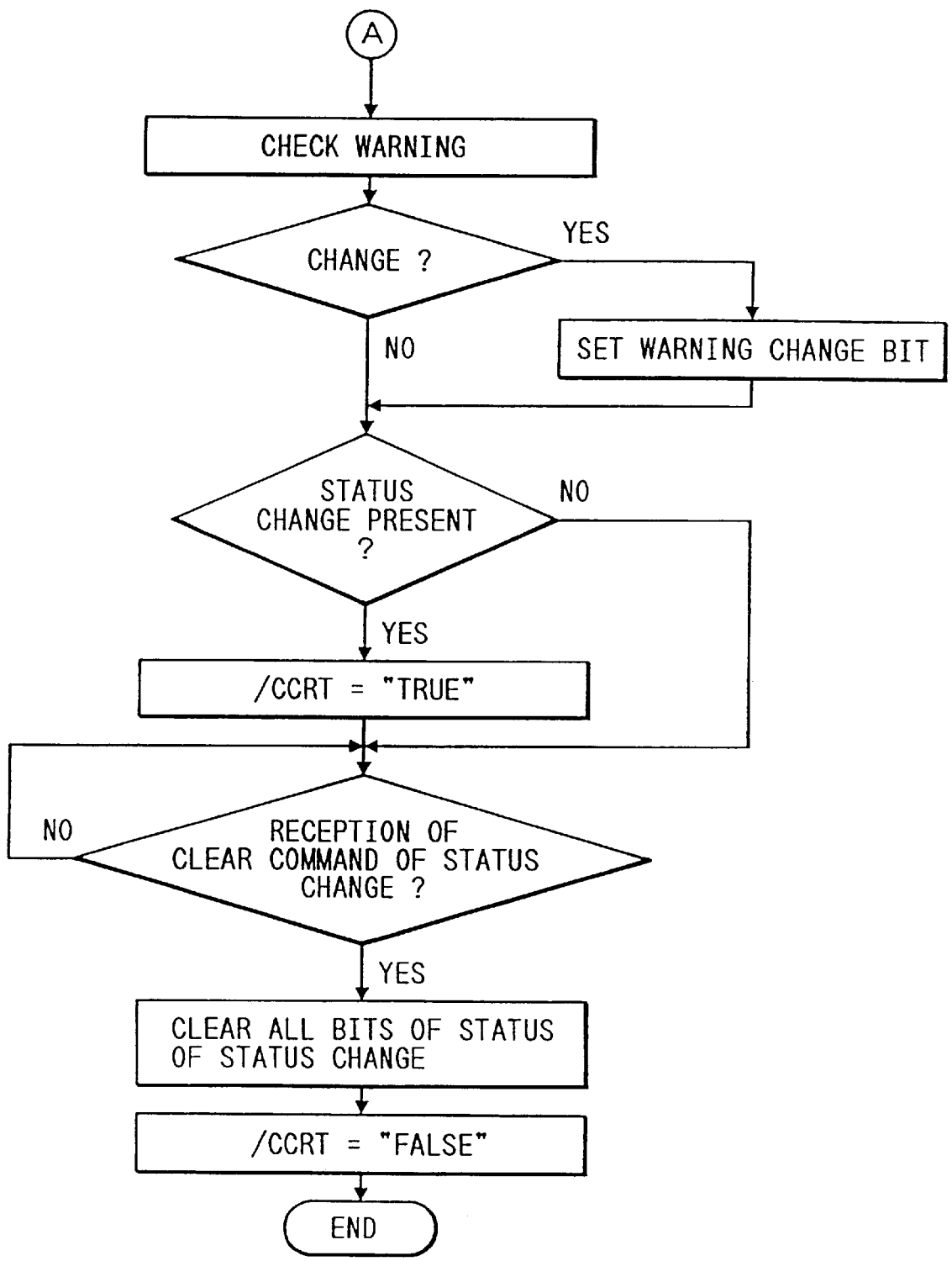
FIG. 17 is which comprised of FIGS. 17A and 17B is a flow chart illustrating another process of outputting a status change from the engine control unit of the fourth embodiment of the invention.

The signal /CCRT may be reset by using a reset request signal. FIGS. 17A and 17B are flow charts illustrating the reset process using the reset request signal. In this embodiment, in response to a reset command for resetting status change information sent from the printer controller 601, the engine control unit 602 clears the status change status and the signal /CCRT. The process of checking a status change is similar to the process described with FIGS. 14A and 14B. However, resetting the status change status (STATUS2) and the signal /CCRT is performed when a dedicated status change clear command is received.

Figure 18:
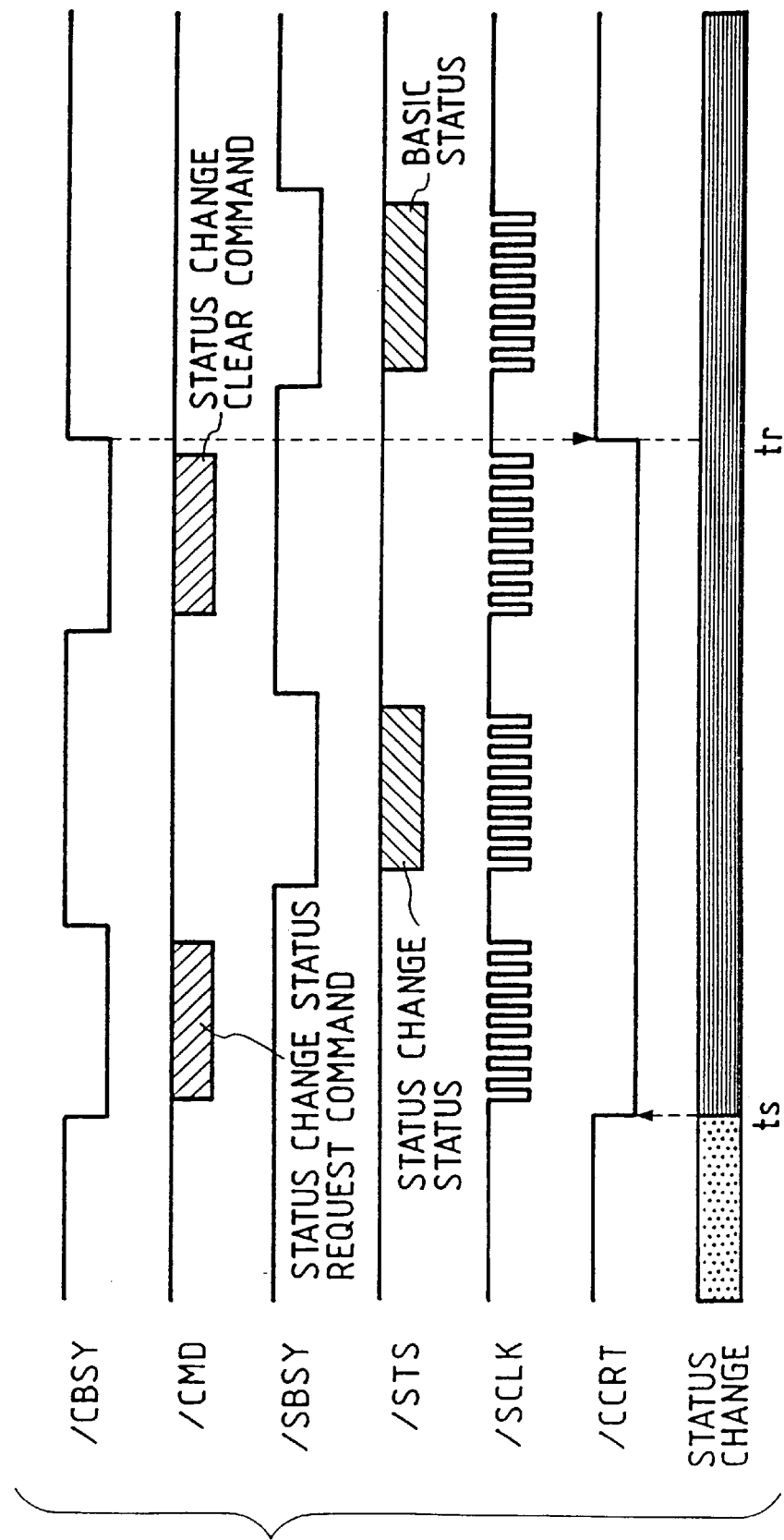
FIG. 18 is a timing chart illustrating status transfer of a fifth embodiment of the invention.

FIG. 18 is a timing chart illustrating the reset process using the status change clear command. Upon reception of the status change clear command from the printer controller 601, the engine control unit 602 clears the status change status and sets the signal /CCRT to "FALSE". Thereafter, the basic status STATUS0 is returned back.

Figure 19:
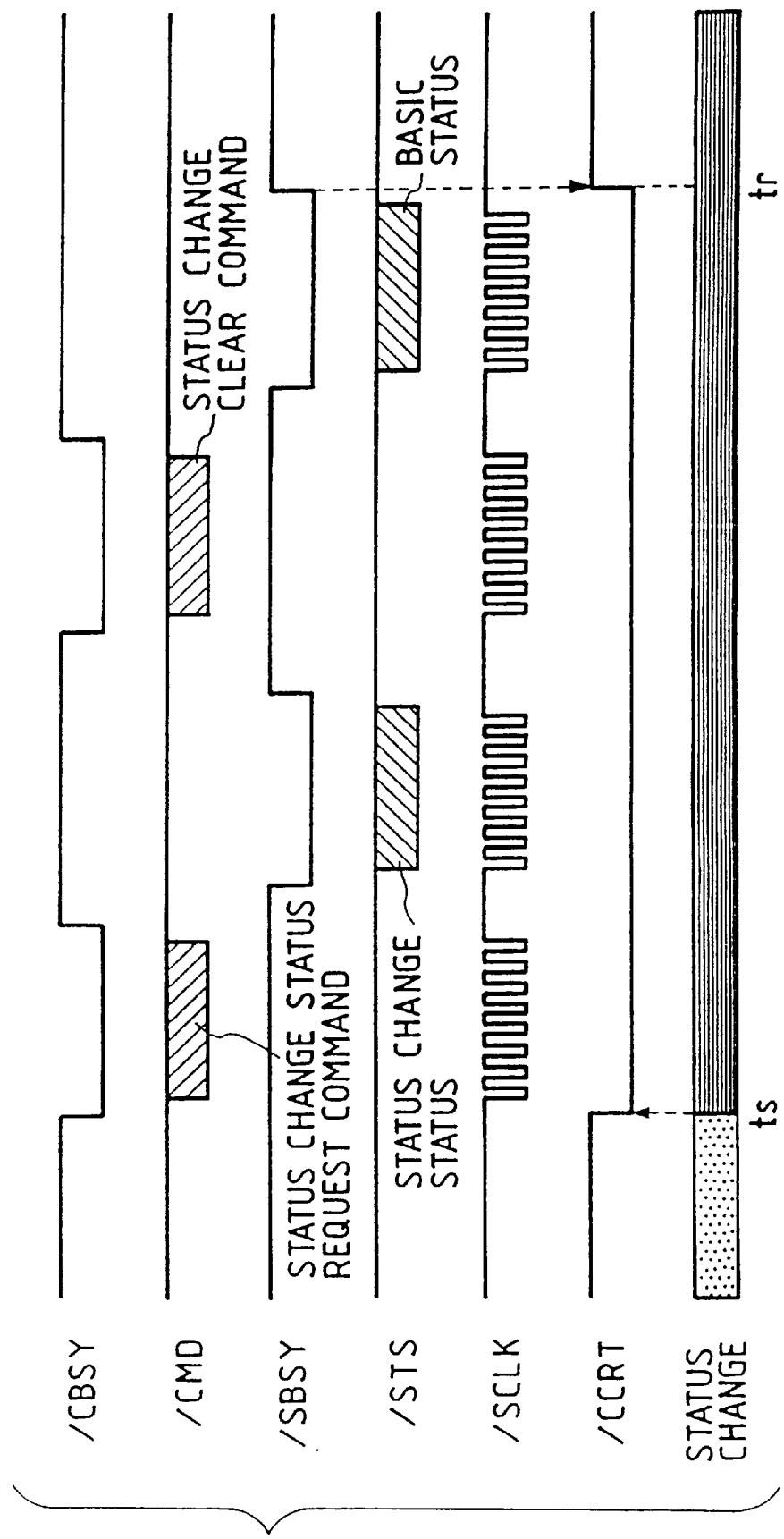
FIG. 19 is a timing chart illustrating status transfer of the fifth embodiment of the invention.

With the timing of resetting-the status change status and the signal /CCRT shown in FIG. 18, the printer controller can clear the status change information (the signal /CCRT and each bit of the status change status) at a desired timing. As shown in FIG. 19, the signal /CCRT may be reset after the basic status is transmitted.

Figure 20:
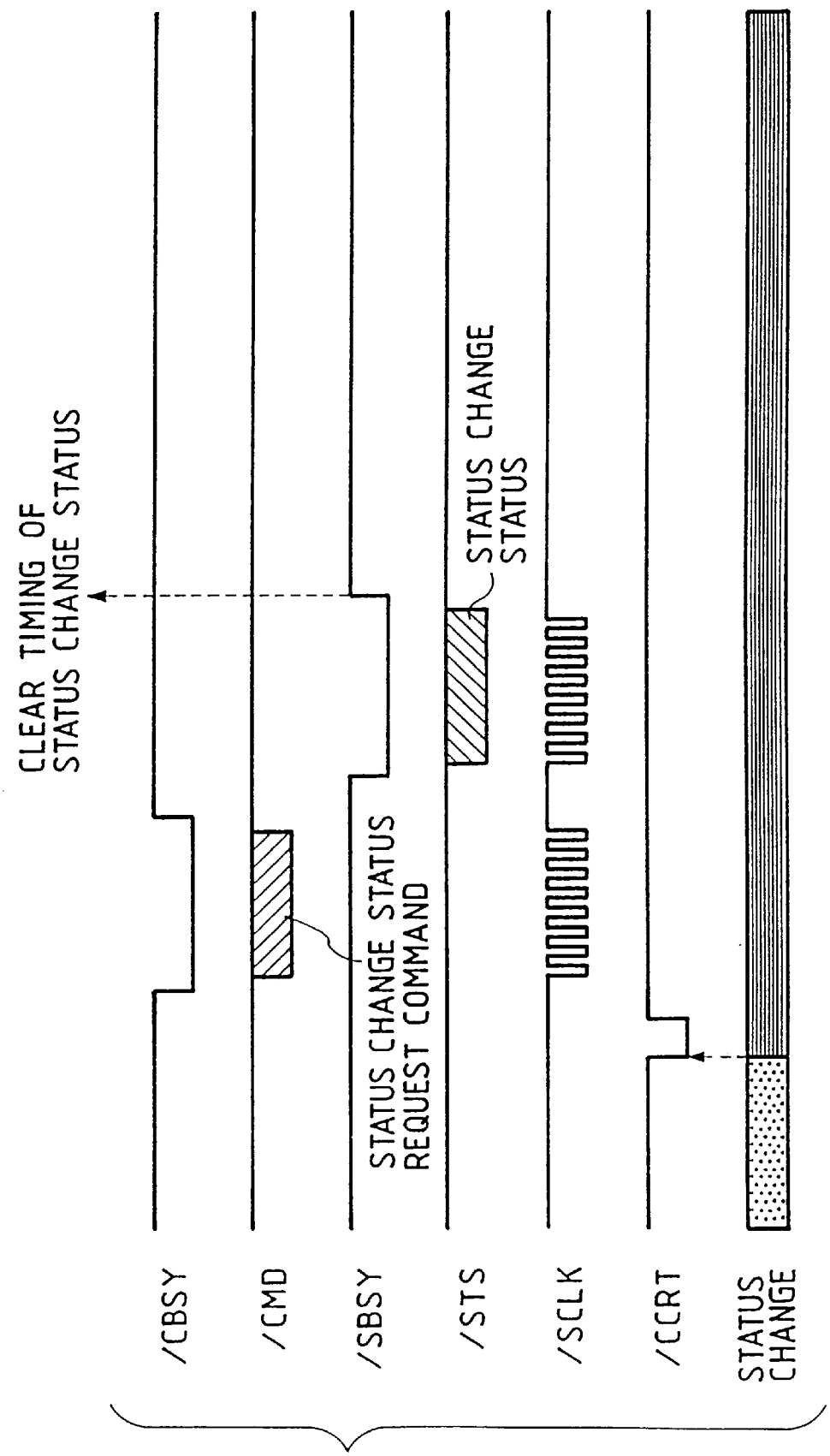
FIG. 20 is a timing chart illustrating status transfer of the fifth embodiment of the invention.

FIG. 20 is a timing chart illustrating another timing of the embodiment.

Figure 21:
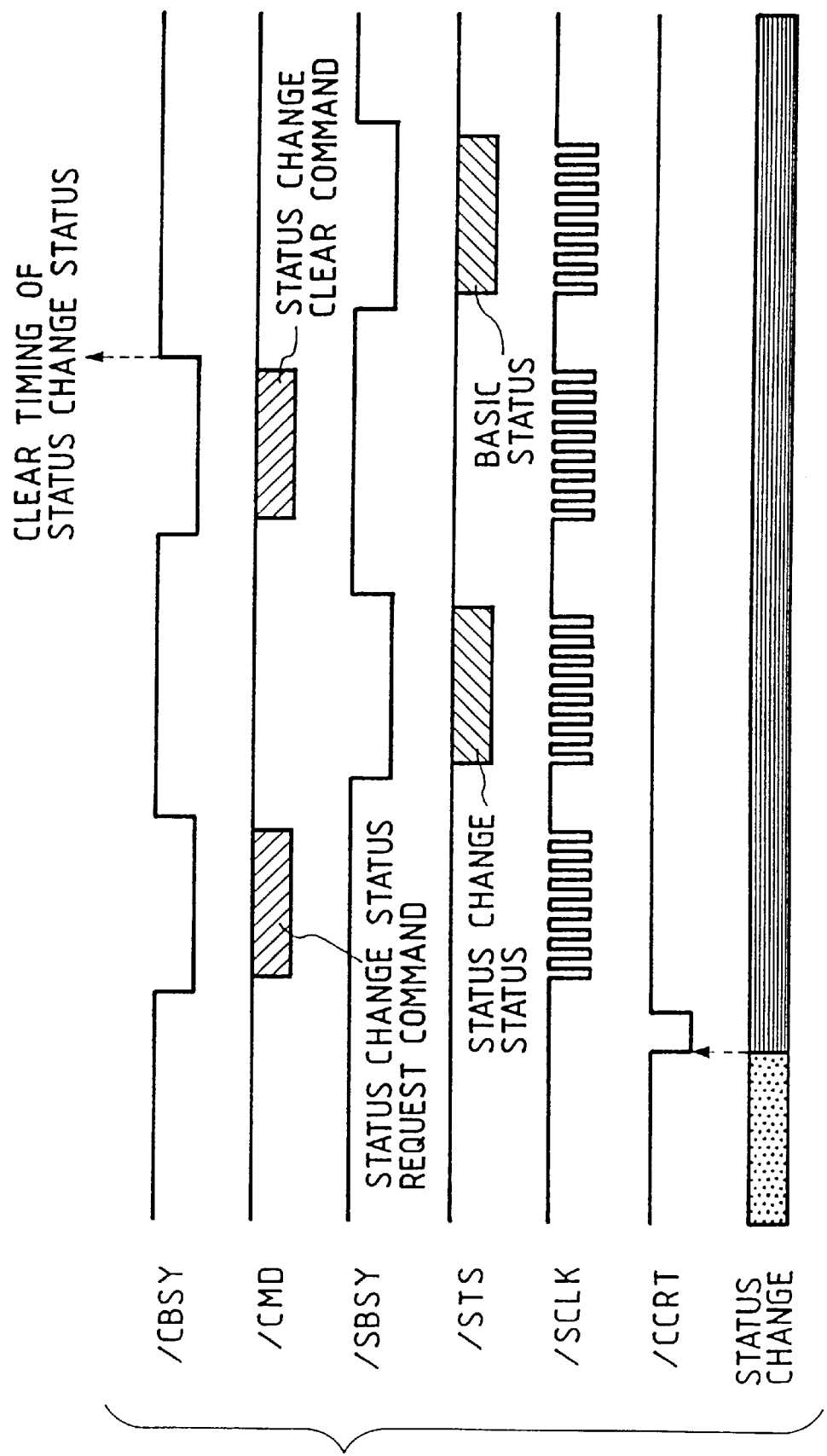
FIG. 21 is a timing chart illustrating status transfer of the fifth embodiment of the invention.

In this example, as a method of informing the printer controller 601 of a status change, the engine control unit 601 sends the /CCRT signal having a predetermined pulse width. Therefore, the signal /CCRT is cleared at the timing determined by the engine control unit 602, not by the status request command or clear command from the printer controller 601. Each bit of the status change status may be reset, as shown in FIG. 20, after the status is transmitted in response to the status change status request command, or may be reset after the status change status clear command is received as shown in FIG. 21.

As a method of resetting the signal /CCRT, one of the signal /CCRT and the status change status may be used independently from the status change status.

Sixth Embodiment

The sixth embodiment is a modification of the fourth and fifth embodiments, only the different points will be described in the following.

In the fourth and fifth embodiments, the signal /CCRT is set to "TRUE" when a status change occurs which makes the "changing status" bit of STATUS0 (FIGS. 12A to 12D) turn to "1". In this embodiment, a command for designating a status change which makes the signal /CCRT set to "TRUE" is provided.

FIG. 22 shows the format of a status change monitor designating command to be issued by the printer controller 601. This command is made of two bytes. The first byte is fixed to 7F (HEX). When the first byte is received by the engine control unit 601, it recognizes this to be the status change monitor designating command, and waits for the second byte. The second byte designates the status number by 6 bits binary, excepting a command error bit (MSB) and a parity bit (LSB). For example, 0D (HEX) is assigned for designating a lower stage paper size status (status No. 6).

The engine control unit 602 monitors the status number designated by the status change monitor designating command, and if the status number is changed, the signal CCRT is set to "TRUE" (L level), for example, for 10 ms. The method of resetting the signal /CCRT may be either that of the fourth embodiment or that of the fifth embodiment. For example, assuming that the upper stage paper size status (status No. 5) is designated by the command (7F (HEX)+0B (HEX)), the signal /CCRT is set to L level each time the paper size of the upper stage paper cassette is changed.

Next, the monitor control process will be described which is executed by a CPU of the engine control unit 602 when the status change monitor designating command is received.

It is first checked whether the status change monitor designating command is received from the printer controller 601. If received, the status designated by the status change monitor designating command is monitored. When the contents of the monitored status change, the signal /CCRT is set to L level, for example, for 10 msec.

As described above, the printer controller 601 designates a status of the engine control unit 602 whose status change is to be detected, whereas the engine control unit 602 informs the printer controller 601 of a change in the contents of the designated status, via the line 523. Therefore, the printer controller 601 is not required to always read the status via serial communications using the lines 518 to 521, so that the read communication process can be simplified.

Seventh Embodiment

Next, a printer of the seventh embodiment will be described. The structure and operation of this printer are similar to the sixth embodiment, and so the description thereof is omitted. FIG. 23 shows the format of a status monitor mask command used for serial communications by the printer of the seventh embodiment.

The status monitor mask command is made of two bytes, and is used with the status change monitor designating command of the sixth embodiment. The first byte of the status monitor mask command is fixed to 3E (HEX). When the first byte is received by the engine control unit 602, it recognizes this to be the status monitor mask command, and waits for the second byte. The second byte designates the mask positions by 6 bits, excepting a command error bit (MSB) and a parity bit (LSB).

If the mask position bit corresponding to each bit of the status designated by the status change monitor designating command is "1", then masking for stopping the status change monitor is performed. If this value is "0", the monitor continues.

For example, assuming that the status change monitor designating command designates the basic status (status No. 0) by the command (7F (HEX)+01 (HEX)), the status monitor mask command having the first byte of 3E (HEX) and the second byte of 3E (HEX) is transmitted in order to monitor the status change of only the print request (second bit). In this case, when the print request bit changes, the signal /CCRT is set to L level, for example, for 10 msec. On the other hand, even if other bits of the basic status change, the signal /CCRT of H level maintains unchanged.

Next, the monitor control process will be described which is executed by the CPU of the engine control unit 602 when the status monitor mask command is received.

It is first checked whether the status change monitor designating command is received from the printer controller 601. If received, it is further checked whether the status monitor mask command is received from the printer controller 601. If received, the status monitor mask command whose first and eight bits of the second byte (refer to FIG. 23) are changed to "1" is stored in a RAM as mask data.

If the status monitor mask command is not still received, a logical sum of the status designated by the status change monitor designating command and the mask data is monitored. If the contents of the logical sum data change, the signal /CCRT is set to L level, for example, for 10 msec.

The mask data has a default value of 81 (HEX) which value has no mask of each status.

As described above, each bit of the status whose change is to be monitored can be masked, allowing to monitor each bit of the status.

Eighth Embodiment

Next, a printer of the eighth embodiment will be described. The structure and operation of this printer are similar to the sixth embodiment, and so the description thereof is omitted. FIG. 24 shows the format of a status designating command used for serial communications by the printer of the eighth embodiment.

The status designating command is made of two bytes, and is used with the status change monitor designating command of the sixth embodiment. The first byte of the status designating command is fixed to 5E (HEX). When the first byte is received by the engine control unit 602, it recognizes this to be the status designating command, and waits for the second byte. The second byte designates status number by 6 bits, excepting a command error bit (MSB) and a parity bit (LSB), so that a particular number is set to the status designated by the status change monitor designating command.

For example, assuming that the status change monitor designating command designates the lower stage paper size status (status No. 6) by the command (7F (HEX)+0D (HEX)), the status designating command having the first byte of 5E (HEX) and the second byte of 1C (HEX) is transmitted in order to designate a legal paper size. In this case, when legal paper sheets are loaded in the lower stage paper cassette, the lower stage paper size status is set to 1C (HEX) which the engine control unit 602 detects, and the signal /CCRT is set to L level, for example, for 10 msec.

On the other hand, if paper sheets other than the legal paper sheets are loaded in the lower stage paper cassette, the lower stage paper size status is set to a value other than 1C (HEX) (for example, 01 (HEX) for A4 size), and the signal /CCRT of H level maintains unchanged.

Next, the monitor control process will be described which is executed by the CPU of the engine control unit 602 when the status designating command is received.

It is first checked whether the status change monitor designating command is received from the printer controller 601. If received, it is further checked whether the status designating command is received from the printer controller 601. If received, the second byte (refer to FIG. 24) of the status designating command is stored in the RAM as designated data.

It is checked whether the status designated by the status change monitor designating command coincides with the above designated data. If it coincides, the signal /CCRT is set to L level, for example, for 10 msec.

If the status designating command is not still received, the status designated by the status change monitor designating command is monitored, and when the contents of the status change, the operation similar to the sixth embodiment is performed.

As described above, only a change of a desired status to a particular state is informed to the printer controller 601, further reducing a communication process load on the printer controller 601.

In the sixth to eighth embodiments described above, the signal /CCRT having a predetermined pulse width is used. Instead, the signal /CCRT may be reset by the method described in the fourth or fifth embodiment, or by another method.

In the above embodiments, a printer is used as the image forming apparatus. Instead, a copier may be used as the image forming apparatus.

The invention is applicable not only to a system constituted by a plurality of apparatuses but also to a system having a single apparatus. Obviously, the invention is also applicable to a system or apparatus to which programs are provided or whose hardware is partially replaced by programs.

As described so far, the image forming apparatus and system of this invention can readily and quickly detect a status change in the apparatus and system. Accordingly, a periodical status check can be reduced considerably and an essential image process of the apparatus and system can be efficiently performed. Furthermore, a status change can be checked only when such a change occurs. Therefore, the controller is not required to always monitor all the statuses of the printer while it is performing the main processes such as image development. Accordingly, the status change can be detected efficiently and the image data developing process or other necessary processes can be executed at high speed.

In the above embodiments, although an electrophotographic printer is used, the invention is not limited thereto, but other types of printers such as ink-jet or thermosensitive printers may also be used.

In the above embodiments, although a vertical sync system by the signals /VSREQ and /VSYNC is used, a system by a signal /TOP (printer engine→controller) may also be used.

The invention is not limited only to the above embodiments, but various modifications are possible without departing from the scope of the appended claims. For example, each of the fourth to eighth embodiments may be combined with the second and third embodiments. Other combinations and the like are to be considered as falling within the scope of this invention.

What is claimed is:
1. A status informing apparatus comprising:
   interface means for performing interface with an external apparatus, said interface means including at least one signal line;
   first changing means for changing a signal level at a predetermined one of the at least one signal line of said interface means from a first level to a second level in response to one of a plurality of types of status changes in said status informing apparatus;
   second changing means for changing the signal level at the predetermined signal line of said interface means from the second level to the first level irrespective of the plurality of types of status changes; and
   informing means for informing the external apparatus of information on the one of the plurality of types of status changes.

2. A status informing apparatus according to claim 1, further comprising additional informing means for informing the external apparatus of further information on the one of the plurality of types of status changes.

3. A status informing apparatus according to claim 1, wherein said status informing apparatus is an image forming apparatus.

4. A status informing apparatus according to claim 3, wherein the plurality of types of status changes include a status change in recording medium set in said image forming apparatus.

5. A status informing apparatus according to claim 3, wherein the plurality of types of status changes include at least one of a status change in size of recording medium set in said image forming apparatus, a status change in presence/absence of the recording medium, and a status change in function of a recording medium feeding unit.

6. An apparatus comprising:
   interface means for performing interface with a status informing apparatus, said interface means having at least one signal line, wherein a predetermined one of the at least one signal line changes in signal level from a first level to a second level in response to one of a plurality of types of status changes in the status informing apparatus and from the second level to the first level irrespective of the plurality of types of status changes; and output means for, when the predetermined signal line changes in signal level from the first level to the second level, outputting a command to the status informing apparatus to request information on the one of the plurality of types of status changes.

7. An apparatus according to claim 6, further comprising additional output means for outputting an additional command to the status informing apparatus to request further information on the one of the plurality of types of status changes.

8. An apparatus according to claim 6, wherein the status informing apparatus is an image forming apparatus.

9. An apparatus according to claim 8, further comprising means for receiving information described in a printer language from a higher class apparatus and means for converting the received information into image data.

10. An apparatus according to claim 8, wherein the plurality of types of status changes include at least one of a status change in size of recording medium set in the image forming apparatus, a status change in presence/absence of the recording medium, and a status change in function of a recording medium feeding unit.

11. A status informing method comprising:

an interface step for performing interface with an external apparatus using an interface means, said interface means including at least one signal line;

a first changing step for changing a signal level at a predetermined one of the at least one signal line of said interface means from a first level to a second level in response to one of a plurality of types of status changes;

a second changing step for changing the signal level at the predetermined signal line of said interface means from the second level to the first level irrespective of the plurality of types of status changes; and an informing step for informing the external apparatus of information on the one of the plurality of types of status changes.

12. A status informing method according to claim 11, further comprising an additional informing step for informing the external apparatus of further information on the one of the plurality of types of status changes.

13. A status informing method according to claim 11, wherein said status informing method is an image forming method.

14. A status informing method according to claim 13, wherein the plurality of types of status changes include a status change in recording medium set in said image forming method.

15. A status informing method according to claim 13, wherein the plurality of types of status changes include at least one of a status change in size of recording medium set in said image forming method, a status change in presence/absence of the recording medium, and a status change in function of a recording medium feeding unit.

16. A status information method comprising:

an interface step for performing interface with a status informing apparatus through an interface means, said interface means having at least one signal line, wherein a predetermined one of the at least one signal line changes in signal level from a first level to a second level in response to one of a plurality of types of status changes in the status informing apparatus and from the second level to the first level irrespective of the plurality of types of status changes; and an output step for, when the predetermined signal line changes in signal level from the first level to the second level, outputting a command to the status informing apparatus to request information on the one of the plurality of types of status changes.

17. A method according to claim 16, further comprising an additional output step for outputting an additional command to the status informing apparatus to request further information on the one of the plurality of types of status changes.

18. A method according to claim 16, wherein the status informing apparatus is an image forming apparatus.

19. A method according to claim 18, further comprising a step for receiving information described in a printer language from a higher class apparatus and a step for converting the received information into image data.

20. A method according to claim 18, wherein the plurality of types of status changes include at least one of a status change in size of recording medium set in the image forming apparatus, a status change in presence/absence of the recording medium, and a status change in function of a recording medium feeding unit.

* * * * *

UNITED STATES PATENT AND TRADEMARK OFFICE
CERTIFICATE OF CORRECTION

PATENT NO.    : 6,311,024 B1
DATED         : October 30, 2001
INVENTOR(S)   : Yoji Serizawa et al.

Figure 2:
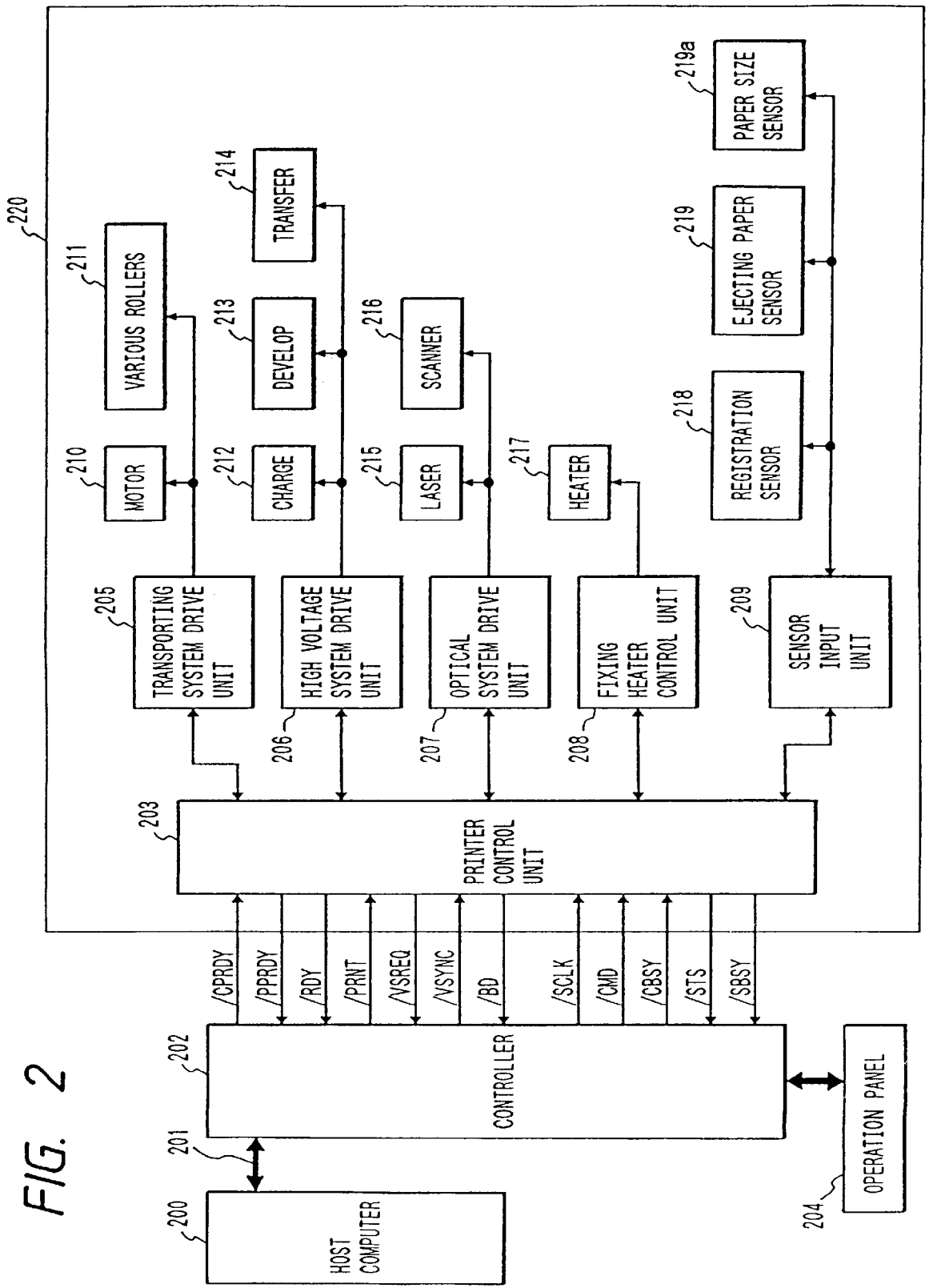
FIG. 2 is a block diagram showing the electrical structure of the laser printer.

It is certified that error appears in the above-identified patent and that said Letters Patent is hereby corrected as shown below:

Title page,
Under Item [57] ABSTRACT, line 1, "he" should read -- the --.
Drawings,
Sheet 2, Figure 2, please replace with the following Fig. 2:

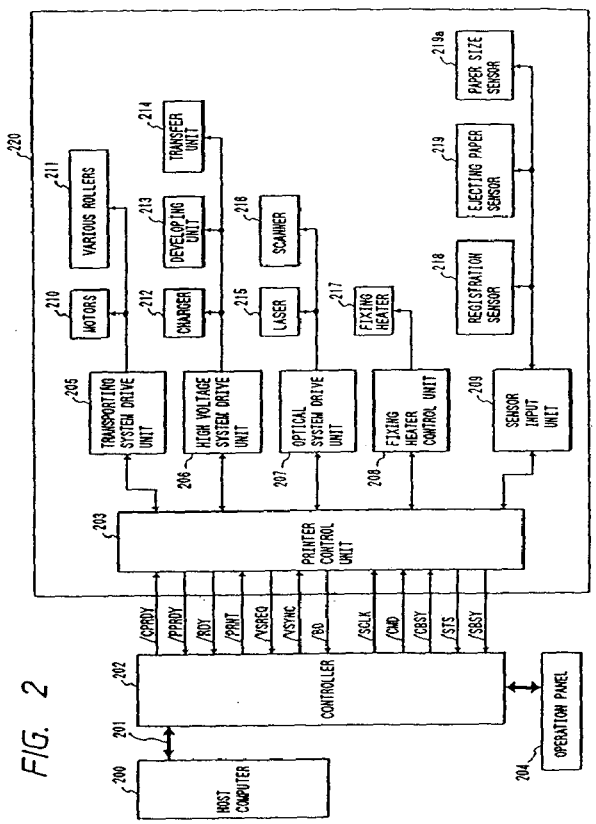

Figure 7:
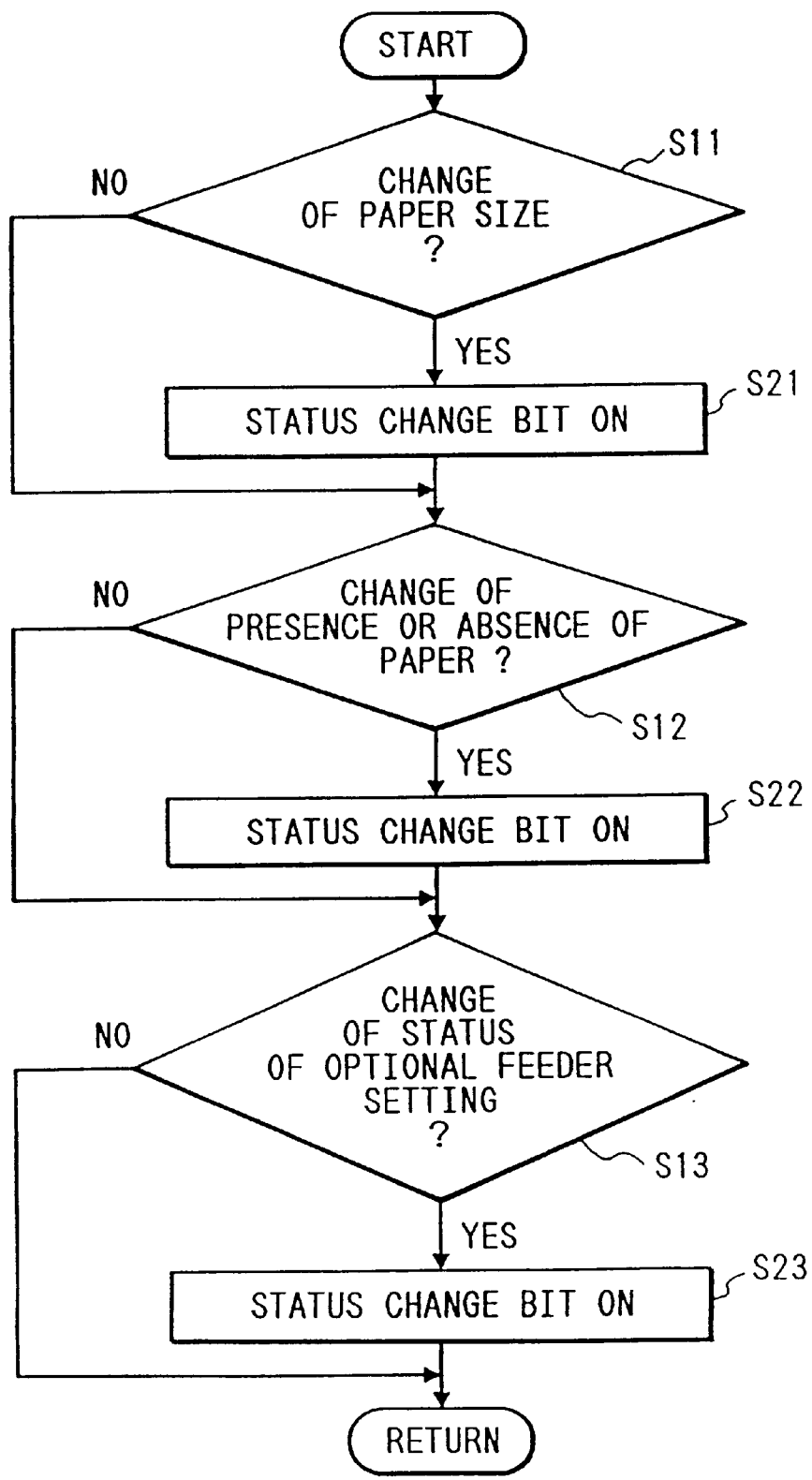
FIG. 7 is a flow chart illustrating the operation of the first embodiment.

Sheet 7, Figure 7, "SETTING" should be deleted;
Sheet 9, Figure 8, "SETTING" should be deleted;

Column 4,
Line 64, "is which" should read -- which is --.

Column 5,
Line 57, "detects" should read -- detect --.

UNITED STATES PATENT AND TRADEMARK OFFICE
CERTIFICATE OF CORRECTION

PATENT NO.    : 6,311,024 B1
DATED         : October 30, 2001
INVENTOR(S)   : Yoji Serizawa et al.

It is certified that error appears in the above-identified patent and that said Letters Patent is hereby corrected as shown below:

<u>Column 7,</u>
Line 4, "has" should read -- have --.

<u>Column 9,</u>
Line 14, "includes" should read -- include --.

<u>Column 11,</u>
Line 3, "resetting-the" should read -- resetting the --.

<u>Column 13,</u>
Line 26, "maintains" should read -- Remains --.

Signed and Sealed this

Twenty-eighth Day of May, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO.   : 6,311,024 B1
DATED        : October 30, 2001
INVENTOR(S)  : Yoji Serizawa et al.

It is certified that error appears in the above-identified patent and that said Letters Patent is hereby corrected as shown below:

Title page,
Under Item [57] ABSTRACT, line 1, "he" should read -- the --.
Drawings,
Sheet 2, Figure 2, please replace with the following Fig. 2:

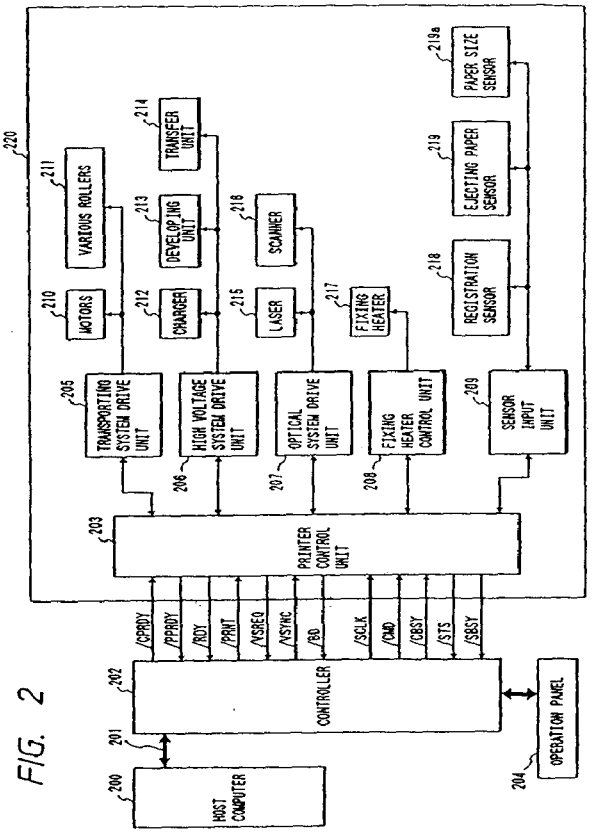

Sheet 7, Figure 7, "SETTING" should be deleted;
Sheet 9, Figure 8, "SETTING" should be deleted;

Column 4,
Line 64, "is which" should read -- which is --.

UNITED STATES PATENT AND TRADEMARK OFFICE
CERTIFICATE OF CORRECTION

PATENT NO. : 6,311,024 B1
DATED : October 30, 2001
INVENTOR(S) : Yoji Serizawa et al.

It is certified that error appears in the above-identified patent and that said Letters Patent is hereby corrected as shown below:

<u>Column 5,</u>
Line 57, "detects" should read -- detect --.

<u>Column 7,</u>
Line 4, "has" should read -- have --.

<u>Column 9,</u>
Line 14, "includes" should read -- include --.

<u>Column 11,</u>
Line 3, "resetting-the" should read -- resetting the --.

<u>Column 13,</u>
Line 26, "maintains" should read -- Remains --.

This certificate supersedes the Certificate of Correction issued May 28, 2002 since this patent number did not appear on the Certificate of Correction listing for May 28, 2002.

Signed and Sealed this

Sixteenth Day of July, 2002

*Attest:*

JAMES E. ROGAN
*Attesting Officer*        *Director of the United States Patent and Trademark Office*